United States Patent
Kumagai et al.

(10) Patent No.: US 9,269,218 B2
(45) Date of Patent: Feb. 23, 2016

(54) IMAGE PROCESSOR AND METHOD THEREFOR

(71) Applicant: EPX CORPORATION, Tokyo (JP)

(72) Inventors: Hiroshi Kumagai, Tokyo (JP); Takayuki Miyazaki, Tokyo (JP)

(73) Assignee: EPX CORPORATION, Tokyo (JP)

( * ) Notice: Subject to any disclaimer, the term of this patent is extended or adjusted under 35 U.S.C. 154(b) by 304 days.

(21) Appl. No.: 13/904,696

(22) Filed: May 29, 2013

(65) Prior Publication Data

US 2013/0303258 A1   Nov. 14, 2013

Related U.S. Application Data

(63) Continuation of application No. PCT/JP2011/006606, filed on Nov. 28, 2011.

(30) Foreign Application Priority Data

Nov. 29, 2010 (JP) ................................. 2010-265169

(51) Int. Cl.
| | |
|---|---|
| G06F 17/00 | (2006.01) |
| G07F 17/32 | (2006.01) |
| G07F 17/34 | (2006.01) |
| G06T 13/00 | (2011.01) |
| G06T 15/00 | (2011.01) |

(52) U.S. Cl.
CPC ............ *G07F 17/3211* (2013.01); *G06T 13/00* (2013.01); *G06T 15/005* (2013.01); *G07F 17/34* (2013.01)

(58) Field of Classification Search
USPC .................................................... 463/16–25
See application file for complete search history.

(56) References Cited

U.S. PATENT DOCUMENTS

| | | | | |
|---|---|---|---|---|
| 5,892,596 A * | 4/1999 | Nonaka et al. | ................. | 358/538 |
| 6,228,125 B1 * | 5/2001 | Kuriyama | ..................... | 382/304 |
| 6,345,118 B1 * | 2/2002 | Ideyama | ....................... | 382/175 |
| 8,610,924 B2 * | 12/2013 | Do et al. | ....................... | 358/1.15 |
| 2007/0046985 A1 * | 3/2007 | Komada | ........................ | 358/1.15 |
| 2010/0099473 A1 | 4/2010 | Ikejiri et al. | | |

FOREIGN PATENT DOCUMENTS

| | | | |
|---|---|---|---|
| JP | 2008-264409 A | 11/2008 | |
| JP | 2010-205289 A | 9/2010 | |

* cited by examiner

*Primary Examiner* — Ronald Laneau
(74) *Attorney, Agent, or Firm* — Birch, Stewart, Kolasch & Birch, LLP

(57) ABSTRACT

By rendering lower half of 30 FPS in the processing of even numbered frame of 60 fps and rendering upper half of 30 fps in the processing of odd numbered frame, the processing load of the processor 70 can be reduced to half. Thus, by delaying image rendering, the image quality degradation can be prevented, therefore stable high-quality images can be displayed.

8 Claims, 30 Drawing Sheets

FIG. 5

TRANSMISSION COMMAND 16bit

| 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|
| H7 | H6 | H5 | H4 | H3 | H2 | H1 | H0 | L7 | L6 | L5 | L4 | L3 | L2 | L1 | L0 |
| UPPER | | | | | | | | LOWER | | | | | | | |

COMMUNICATION FORMAT (FIXED LENGTH)

|   | 7 | 6 | 5 | 4 | 3 | 2 | 1 | 0 |
|---|---|---|---|---|---|---|---|---|
| 0 | 0 | 1 | ID (COUNT) | | | | | |
| 1 | 0 | 0 | H7 | H6 | H5 | H4 | H3 | H2 |
| 2 | 0 | 0 | H1 | H0 | L7 | L6 | L5 | L4 |
| 3 | 0 | 0 | L3 | L2 | L1 | L0 | – | – |
| 4 | 0 | 0 | SUM | | | | | |

0x00～0x3F
(com >> 10) & 0x3f;
(com >> 4) & 0x3f;
(com << 2) & 0x3c;

FIG. 6

MAIN LOTTERY

"LOTTERY" DRAWN AT MAIN

| No | CORRESPONDED LOTTERY |
|----|----------------------|
| 1  | BLANK                |
| 2  | REPAY                |
| 3  | PRESS ORDER WINING COMBINATION |
| 4  | SMALL WINING COMBINATION 1 |
| 5  | SMALL WINING COMBINATION 2 |
| 6  | BOUNUS               |

3D LOTTERY

"LOTTERY" CONVERTED AT SUB SIDE

| No | CORRESPONDED LOTTERY |
|----|----------------------|
| 1  | BLANK COMBINATION    |
| 2  | CHANCE COMBINATION "A" |
| 3  | CHANCE COMBINATION "B" |
| 4  | MIDDLE SECTION CHERRY |
| 5  | CORNER CHERRY        |
| 6  | WATERMELON "A"       |
| 7  | WATERMELON "B"       |
| 8  | BELL "A"             |
| 9  | BELL "B"             |
| 10 | REPLAY "A"           |
| 11 | REPLAY "B"           |
| 12 | REACH COMBINATION "A" |
| 13 | REACH COMBINATION "B" |

FIG. 19

| No | FLAG NAME | FLAG NUMBER | TABLE | DISTRIBUTE [n/256] | 1st TABLE LEFT | 1st TABLE MIDDLE | 1st TABLE RIGHT |
|---|---|---|---|---|---|---|---|
| 0 | BLANK | 0 | 0 | 64 | 0 | 0 | 0 |
| 1 | BLANK | 0 | 1 | 64 | 1 | 0 | 0 |
| 2 | BLANK | 0 | 2 | 64 | 2 | 2 | 2 |
| 3 | BLANK | 0 | 3 | 64 | 3 | 0 | 0 |
| 4 | BELL | 1 | 0 | 128 | 1 | 1 | 1 |
| 5 | BELL | 1 | 1 | 128 | 10 | 5 | 3 |
| 6 | WATERMELON | 2 | 0 | 192 | 3 | 3 | 3 |
| 7 | WATERMELON | 2 | 1 | 64 | 6 | 4 | 4 |
| 8 | CHERRY | 3 | 0 | 192 | 7 | 10 | 10 |
| 9 | CHERRY | 3 | 1 | 32 | 8 | 10 | 10 |
| 10 | CHERRY | 3 | 2 | 32 | 9 | 10 | 10 |

FIG. 20

| PRESS ORDER | | TRUE | | | FALSE | | |
|---|---|---|---|---|---|---|---|
| SYMBOL NUMBER | SLIDE FLAME NUMBER | STOP POSITION | SECOND STOP TABLE | | SLIDE FLAME NUMBER | STOP POSITION | SECOND STOP TABLE |
| 20 | 2 | ← | 0 | | 2 | ← | 1 |
| 19 | 3 | ● | 0 | | 3 | ← | 1 |
| 18 | 0 | ← | 0 | | 0 | ● | 1 |
| 17 | 1 | ● | 0 | | 1 | ← | 1 |
| 16 | 0 | ← | 0 | | 0 | ● | 1 |
| 15 | 1 | ← | 0 | | 1 | ← | 1 |
| 14 | 2 | ← | 0 | | 2 | ← | 1 |
| 13 | 3 | ● | 0 | | 3 | ← | 1 |
| 12 | 4 | ← | 0 | | 4 | ● | 1 |
| 11 | 0 | ● | 0 | | 0 | ← | 1 |
| 10 | 1 | ← | 0 | | 1 | ● | 1 |
| 9 | 2 | ← | 0 | | 2 | ← | 1 |
| 8 | 0 | ● | 0 | | 0 | ● | 1 |
| 7 | 1 | ← | 0 | | 1 | ← | 1 |
| 6 | 0 | ← | 0 | | 0 | ← | 1 |
| 5 | 1 | ← | 0 | | 1 | ← | 1 |
| 4 | 2 | ← | 0 | | 2 | ← | 1 |
| 3 | 3 | ← | 0 | | 3 | ← | 1 |
| 2 | 4 | ← | 0 | | 4 | ← | 1 |
| 1 | 0 | ← | 0 | | 0 | ● | 1 |
| 0 | 1 | ← | 0 | | 1 | ← | 1 |

FIG. 23

| SYMBOL NUMBER | STOP SCORE |
|---|---|
| 20 | 0 |
| 19 | 1 |
| 18 | -10 |
| 17 | 1 |
| 16 | 0 |
| 15 | 0 |
| 14 | 1 |
| 13 | 1 |
| 12 | 0 |
| 11 | 0 |
| 10 | 1 |
| 9 | -10 |
| 8 | 1 |
| 7 | 0 |
| 6 | 0 |
| 5 | 0 |
| 4 | 0 |
| 3 | 0 |
| 2 | 1 |
| 1 | 0 |
| 0 | 0 |

FIG. 25

| PRESS ORDER | | TRUE | | | FALSE | |
|---|---|---|---|---|---|---|
| SYMBOL NUMBER | STOP SCORE | THIRD STOP TABLE | SEARCH FLAG | STOP SCORE | THIRD STOP TABLE | SEARCH FLAG |
| 20 | 0 | 1 | 0 | 0 | 0 | 0 |
| 19 | 1 | 1 | 0 | 0 | 0 | 0 |
| 18 | 0 | 1 | 0 | 1 | 0 | 0 |
| 17 | 1 | 1 | 0 | 0 | 0 | 0 |
| 16 | 0 | 1 | 0 | 1 | 0 | 0 |
| 15 | 1 | 1 | 1 | 0 | 0 | 1 |
| 14 | 0 | 1 | 0 | 1 | 0 | 0 |
| 13 | 0 | 1 | 1 | 0 | 0 | 0 |
| 12 | 0 | 1 | 0 | 1 | 0 | 0 |
| 11 | 1 | 1 | 0 | 0 | 0 | 0 |
| 10 | 0 | 1 | 0 | 1 | 0 | 0 |
| 9 | 1 | 1 | 0 | 0 | 0 | 0 |
| 8 | 0 | 1 | 0 | 1 | 0 | 0 |
| 7 | 0 | 1 | 0 | 0 | 0 | 1 |
| 6 | 0 | 1 | 0 | 0 | 0 | 0 |
| 5 | 0 | 1 | 0 | 0 | 0 | 0 |
| 4 | 0 | 1 | 0 | 0 | 0 | 0 |
| 3 | 1 | 1 | 0 | 1 | 0 | 0 |
| 2 | 0 | 1 | 0 | 0 | 0 | 0 |
| 1 | 0 | 1 | 0 | 0 | 0 | 0 |
| 0 | 0 | 1 | 0 | 0 | 0 | 0 |

PRESS POSITION →

FIG. 26

| SYMBOL NUMBER | STOP SCORE |
|---|---|
| 20 | 0 |
| 19 | 2 |
| 18 | -10 |
| 17 | 2 |
| 16 | 1 |
| 15 | 0 |
| 14 | 2 |
| 13 | 1 |
| 12 | 0 |
| 11 | 0 |
| 10 | 2 |
| 9 | -10 |
| 8 | 2 |
| 7 | 0 |
| 6 | 0 |
| 5 | 0 |
| 4 | 0 |
| 3 | 0 |
| 2 | 2 |
| 1 | 0 |
| 0 | 0 |

PRESS POSITION →

PRESS POSITION →

FIG. 30

| PRESS ORDER SYMBOL NUMBER | TRUE | | FALSE | |
|---|---|---|---|---|
| | STOP SCORE | SEARCH FLAG | STOP SCORE | SEARCH FLAG |
| 20 | 1 | 0 | 0 | 0 |
| 19 | 0 | 0 | 1 | 0 |
| 18 | 0 | 0 | 0 | 0 |
| 17 | 0 | 1 | 0 | 0 |
| 16 | 1 | 0 | 1 | 1 |
| 15 | 0 | 0 | 0 | 0 |
| 14 | 1 | 0 | 1 | 0 |
| 13 | 0 | 0 | 1 | 0 |
| 12 | 0 | 0 | 0 | 0 |
| 11 | 1 | 0 | 1 | 0 |
| 10 | 0 | 1 | 0 | 0 |
| 9 | 0 | 0 | 1 | 0 |
| 8 | 0 | 0 | 0 | 0 |
| 7 | 0 | 0 | 1 | 0 |
| 6 | 0 | 0 | 0 | 0 |
| 5 | 1 | 0 | 1 | 1 |
| 4 | 0 | 0 | 0 | 0 |
| 3 | 0 | 0 | 1 | 0 |
| 2 | 1 | 0 | 1 | 0 |
| 1 | 0 | 0 | 0 | 0 |
| 0 | 0 | 0 | 0 | 0 |

IMAGE PROCESSOR AND METHOD THEREFOR

CROSS REFERENCE TO RELATED APPLICATIONS

This application is a Continuation of PCT International Application No. PCT/JP2011/006606 filed on Nov. 28, 2011, which claims priority under 35 U.S.C. §119(a) to Patent Application No. 2010-265169 filed in Japan on Nov. 29, 2010, all of which are hereby expressly incorporated by reference into the present application.

FIELD OF INVENTION

The present invention relates to an image processor and method therefor.

BACKGROUND

When performing rendering processing, there is a case in which a movement of some area in the screen is very fast, and that of the other area is slow.

Problem to be Solved

However, in the image processor of prior art, there is a problem that it is required that rendering processing of high flame late is performed with respect to area in which movement is slow in order to meet a condition of image quality of area in which movement is fast, therefore a load of the processor is heavy.

The present invention was made in view of these situations, the purpose of the present invention is to provide an image processor and method therefor which can reduce load of processing when displaying image of fast movement only in a part of area of screen.

SUMMARY OF INVENTIONS

The present invention is an image processor comprising: a first memory group comprising a first memory and a second memory which store image data of image to be displayed at a first rate and selecting the first memory and the second memory alternately as a first rendering target and a first reading target; a second memory group a second memory group comprising a third memory and a fourth memory, storing image data of a second rate which is shorter than the first rate and includes a first image data and a second image data and selecting the third memory and the fourth memory as a second rendering target; and a control unit
wherein
the control unit performs
a first processing which clears the memory of the first rendering target among the first memory and the second memory, writes the image data of the first rate corresponding into one or more first area among a plurality of divided areas of the first rendering target of the memory and does not write in a second area other than the first area when processing the first image data;
a second processing which does not clear the memory of the first rendering target in which the first image data is written in the first processing,
writes the image data of the first rate corresponding to the area into the second area among the plurality of divided areas, dose not writes in the first area,
then switches the first rendering target and the first reading target between the first memory and the second memory when processing the second image data;
a third processing which is performed between the first processing and the second processing and writes image data read from the memory of the first reading target into the memory of the second rendering target among the third memory and the fourth memory; and
a fourth processing which, is performed between the first processing and the second processing and before or after the third processing, and writes the first image data or the second image data of the second rate into a predetermined area of the memory of the second rendering target;
wherein the first processing or the second processing is performed after the processing which is performed later among the third processing and the fourth processing.

The present invention is a method of image processing which is performed using
a first memory group comprising a first memory and a second memory which store image data of image to be displayed at a first rate and selecting the first memory and the second memory alternately as a first rendering target and a first reading target; a second memory group comprising a third memory and a fourth memory, storing image data of a second rate which is shorter than the first rate and includes a first image data and a second image data and selecting the third memory and the fourth memory as a second rendering target and a second reading target; and a control unit,
wherein
the control unit performs
a first processing which clears the memory of the first rendering target among the first memory and the second memory, writes the image data of the first rate corresponding into one or more first area among a plurality of divided areas of the first rendering target of the memory and does not write in a second area other than the first area when processing the first image data;
a second processing which does not clear the memory of the first rendering target in which the first image data is written in the first processing,
writes the image data of the first rate corresponding to the area into the second area among the plurality of divided areas, dose not writes in the first area,
then switches the first rendering target and the first reading target between the first memory and the second memory when processing the second image data;
a third processing which is performed between the first processing and the second processing and writes image data read from the memory of the first reading target into the memory of the second rendering target among the third memory and the fourth memory; and
a fourth processing which is performed between the first processing and the second processing and before or after the third processing, and writes the first image data or the second image data of the second rate into a predetermined area of the memory of the second rendering target;
wherein the first processing or the second processing is performed after the processing which is performed later among the third processing and the fourth processing.

BRIEF DESCRIPTION OF DRAWINGS

FIG. 5 is a drawing for explaining an example of the format of the data (command) transmitted from the sub-sub substrate 7 to the sub main substrate 5.

FIG. 6 is a drawing for explain the conversion processing from a main lottery to a 3D lottery.

FIG. 19 is a drawing for showing an example of production use stop control table.

FIG. 20 is a drawing for showing an example of first stop table.

FIG. 23 is a view showing an example of vertical stop buffer.

FIG. 25 is a drawing for showing an example of second stop table.

FIG. 26 is a drawing for showing an example adding stop score of second stop table to vertical stop buffer.

FIG. 30 is a drawing for showing an example of third stop table.

DETAILED DESCRIPTION OF THE INVENTION

Below a slot machine of a pachinko parlor of an embodiment of the present invention will be explained.

Figure 1:
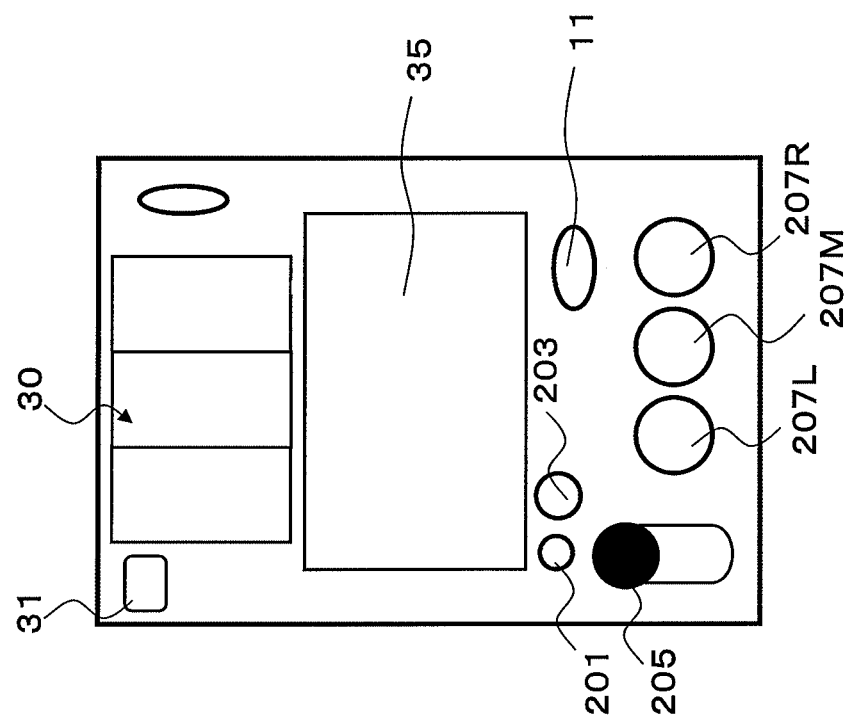
FIG. 1 is a drawing for explaining a display and an operation unit, etc. located at front of the slot machine of the present invention.

FIG. 1 is a drawing for explaining a display and an operation unit, etc. located at front of the slot machine of the present invention.

As shown in FIG. 1, a main-reel unit 30, notice lamp 31, display 35, medal insert unit 11, one piece bet button 201, three pieces bet button 203, start lever 205, left stop button 207L, middle stop button 207M and right stop button 207R are located in front of the slot machine 1.

The main-reel unit 30 is an example of the display of the present invention.

The start lever 205 is an example of the start instruction input unit of the present invention.

The left stop button 207L, middle stop button 207M and right stop button 207R are an example of the end instruction input unit of the present invention.

The main-reel unit 30 has three reels (main-reels) which several kinds of symbols are formed on peripheral surface thereof and reel rotation unit 17 (FIG. 2) which drives rotation of these three main-reels respectively. For example 21 symbols are formed in line on the peripheral surfaces of each main-reel. Through a transparent display window located in the front of the slot machine, three adjacent symbols of each reel are displayed. When all main-reels stop, 9 symbols arranged in three lows and three columns are displayed on the display window.

The notice lamp 31 is connected to the sub main substrate 5 (FIG. 2) later mentioned, and flashes on and off depending on winning prize results.

The medal insert unit 11 comprises a mechanism for inserting and storing medals and a sensor detecting the insert of the medals.

One piece of the one piece bet button 201 and three pieces of the three pieces bet button 203 are an input apparatus to set the number of pieces of the medals for betting by one play. One piece of medal is used for one play by pressing of one piece of the one piece bet button 201, and three pieces of medals are used for one play by pressing of three pieces of the three pieces bet button 203. In case that the number of medals to be bet is one piece, wining a prize or not is judged based on a combination of symbols (stop symbols) in which the same symbols appears in lateral line of middle section of the three lows and three columns described above. In case that the number of medals for betting is three pieces, wining a prize or not is judged based on the stop symbols in which the same symbols appear in three lines of lateral line of upper, middle and lower section and in two lines of right slant lower direction and left slant upper direction. Note that a line to be judged whether wining a prize or not in a sequence of symbols in three lows and three columns is called as "wining prize line".

The start lever 205 is an input apparatus to input the instructions of the rotation start of the main-reel unit 30. When a medal is inserted from the medal insert unit 11, and the start lever 205 is beaten in the state that the number of pieces of the medal is set by one piece of the one piece bet button 201 or three pieces of the three pieces bet button 203, the rotation of the main-reel begins in the main-reel unit 30.

The left stop button 207L, the middle stop button 207M and the right stop button 207R are input apparatuses for inputting the stop instructions of each main-reel of the main-reel unit 30. When the [207] is pressed the left main-reel will be stopped, when the middle stop button 207M is pressed d the middle main-reel will be stopped, when the right stop button 207R is pressed the right main-reel will be stopped, The display 35 is a display unit to display a picture for production, and is constituted by including a liquid crystal display panel or EL display panel. As mentioned later, video showing the reel (sub-reel) for production which simulates a main-reel, rotates and stops, and animation video such as character are displayed.

Figure 2:
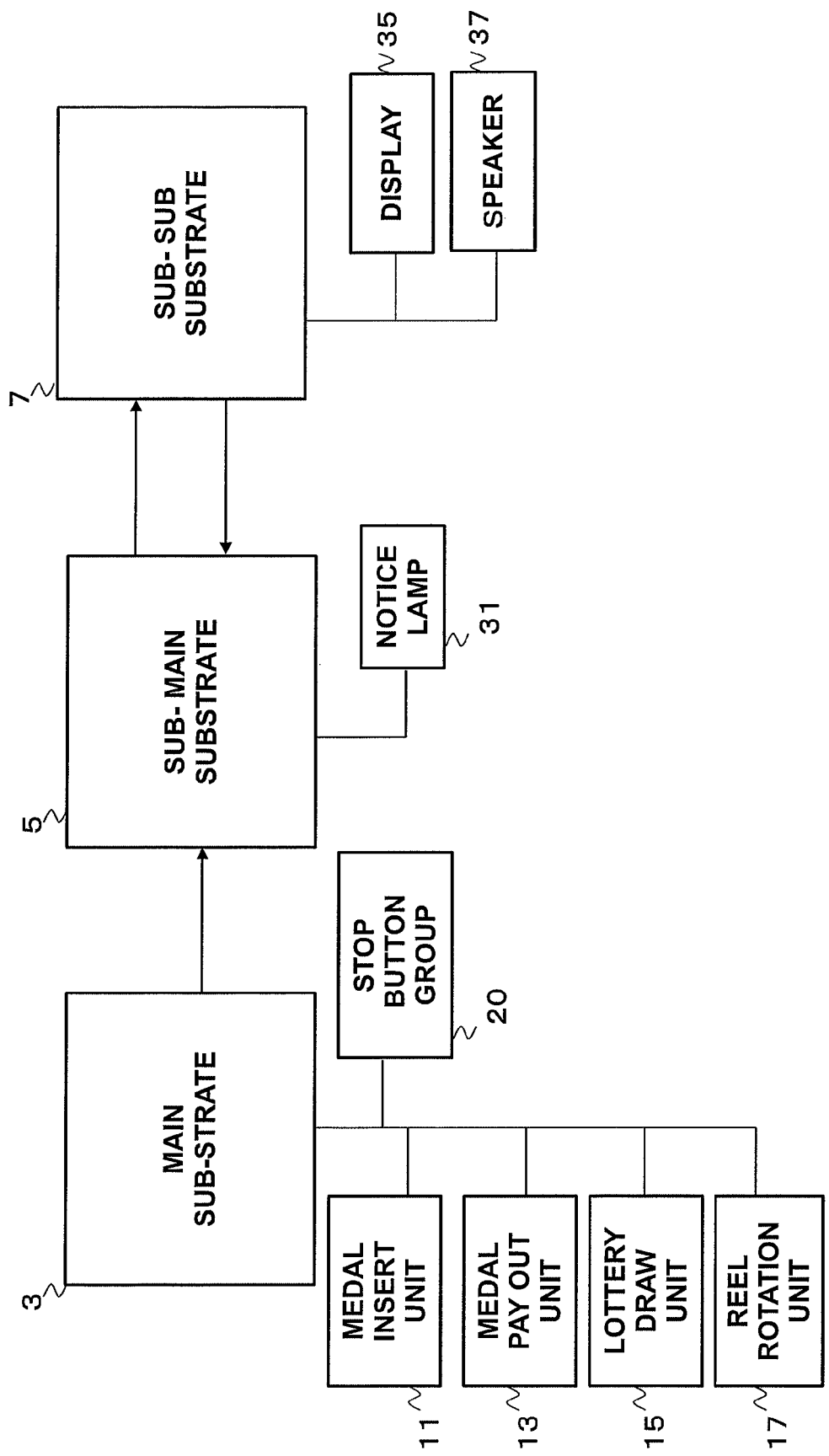
FIG. 2 is a block diagram of a machine of a pachinko parlor of the embodiment of the present invention.

FIG. 2 is a drawing for explaining an example of a configuration of the slot machine 1 relating to the present invention.

The slot machine 1 relating to the present invention has the main substrate 3, the sub main substrate 5 and the sub-sub substrate 7 as shown in FIG. 2.

The main substrate 3 is an example of the first control unit of the present invention.

The sub main substrate 5 is an example of the second control unit of the present invention.

The sub-sub substrate 7 is an example of the third control unit of the present invention.

[Main Substrate 3]

The main substrate 3 is a circuit block controlling the general progress of the amusement and, for example, configured by including a processor and a memory carrying out processing according to a program. The main substrate 3 controls, for example, a series of operation such as setting of the bet number of pierce of the medal, the rotation start and stop of the main-reel, the lottery of a position (amusement utility) deciding stop symbols, the stop control of the reel depending on the lottery result of the winning combination, the judgment of the winning prize result according to stop symbols, and paying out the medals.

In an example of FIG. 2 the main substrate 3 is connected with the medal insert unit 11, medal pay out unit 13, lottery draw unit 15, reel rotation unit 17 and button group 20 (one piece bet button 201, three pieces bet button 203, start lever 205, left stop button 207L, middle stop button 207M, right stop button 207R, etc.)

The main substrate 3 watches a detective signal of the medal insert from the medal insert unit 11 and records the number of pieces of the medal which is stored for using it for the amusement.

When medals of the suitable number of pieces are inserted in the medal insert unit 11 and start lever 205 is beaten in the state that the bet number of pieces of the medal is set by Bet button (201,203), the main substrate 3 makes the lottery draw unit 15 carry out the lottery of a symbol combination for amusements and controls the reel rotation unit 17 of the main-reel unit 30 to start the rotation of the three main-reels.

The symbol combination for amusement to be drawn for lot by the lottery draw unit 15 is a symbol combination relating giving value for amusement such as medals, etc. and decides mainly the combination of symbols (stop symbols) which are stopped on the wining prize line. For example, as the symbol combination for amusements, there are a small symbol combination for paying out the medals every one amusement, a bonus symbol combination in which stop symbols for paying medals repeatedly in a multiple amusement are appeared, and a replay symbol combination in which insert of medals will be unnecessary for amusement. The lottery draw unit 15 determines a wining symbol combination by drawing among the plurality of symbol combinations.

Note that, in the present embodiment, wining symbol combinations determined by the lottery draw unit 15 includes a "failure symbol combination" by which amusement value will not be given.

The main-reels of left, middle or right corresponding to the reel stop button which is pressed will be stopped, when after starting the rotation of the main-reel according to the instruction of the start lever 205, the instruction for stopping rotation of the reel is input by pressing any either of the three reel stop buttons left stop button 207L, middle stop button 207M, right stop button 207R.

The main substrate 3 controls the stop position (rotary angle) of the main-reel so that the main-reel for the stop targets stops in the symbol according to the wining symbol combination.

For example, when the bonus symbol combination is the wining symbol combination, the main substrate 3 controls (control by drawing) the reel rotation unit 17 so that these symbols are stopped on the winning prize line in the case there are symbols of the bonus symbol combination within a range a number of the slide flames) from the standard symbol combination (symbol combination of lower section in the display window of the main-reel) of the reel at the timing the reel stop button is pressed.

Further the failure symbol combination is the wining symbol combination, the main substrate 3 control (kick control) the reel rotation unit 17 so that the main-reel stops on the symbols by which other symbol combinations will not be established.

When three of the main-reels are stopped according to the operation of the player, the main substrate 3 judges a result of the winning prize based on a combination of the symbols which are stopped on the winning prize line. Then when the stop symbols which gets the winning prize are one which causes paying out, the main substrate 3 control the medal pay out unit 13 to pay out the medals of the number of pieces according to the stop symbols.

Further, the main substrate 3 outputs the data (command) indicating the progress state of the amusement by the rotation and the stop of the main-reel to the sub main substrate 5 one by one.

For example, the main substrate 3 output data indicating the number of pieces of the spent medal or the number of pieces of a medal stored in the medal insert unit 11 to the sub main substrate 5 when a medal is inserted in the medal insert unit 11.

The main substrate 3 transmits data indicating the press operation to the sub main substrate 5 when the bet buttons (201, 203) are pressed.

When the start lever 205 is beaten in the state that the bet number of pieces of the medal was set by the bet button (201,203), the main substrate 3 transmits the data (data ordering the rotation start of the main-reel) indicating that the start lever 205 is beaten to the sub main substrate 5.

When the lottery draw unit 15 draws (holds a lottery) according to the beat of the start lever 205, the main substrate 3 transmits the data (wing symbol combination data) indicating the symbol combination of amusement utility use which is wining to the sub main substrate 5.

When a reel stop button (207L, 207M, 207R) is pressed in the state that either main-reel rotates (turns) in the main-reel unit 30, the main substrate 3 transmits data indicating the reel stop button corresponding is pressed (data instructing the rotation stop of the main-reel corresponding)) to the sub main substrate 5.

When stopping the three main-reels and judging whether it is winning prize or not, the main substrate 3 transmits the data indicating the content of the winning prize to the sub main substrate 5. Further when paying out the medals from the medal pay, out unit 13 according to the result of the winning prize, the main substrate 3 transmits data indicating the pieces of the medals which are paid out to the sub main substrate 5.

[Sub Main Substrate 5]

The sub main substrate 5 is a circuit block which receives data (command) indicating the progress state of the amusement and decides contents of the production according to the received data, the sub main substrate 5 comprise a processor executing the processing according to a program and a memory.

The sub main substrate 5 decides one production pattern among a plurality of production patterns predetermined according to data of the wining symbol combination (wining symbol combination data) for amusement use transmitted from the main substrate 3. Then the sub main substrate 5 generates data (production indication data) indicating contents of the production (video of the display 35 and audio of the speaker 37) based on the decided production symbol whenever receiving the data indicating the progress state of the amusement from the main substrate 3.

For example, the sub main substrate 5 stores data which will be a trigger of the production among data indicating the progress state of the amusement transmitted from the main substrate 3 (for example rotation start instruction data of the main-reel, etc.) and a trigger table which is corresponded with the information relating the contents of the production to be output by the data (for example production indication data) into storage apparatus.

The sub main substrate 5 selects one trigger table among the plurality of trigger tables stored in the storage apparatus according to the wining symbol combination for amusement (math lottery) indicated by the wining symbol combination when receiving the wining symbol combination data from the main substrate 3. Then the sub main substrate 5 refers the selected trigger table to generate the production indicating data and transmits this to the sub-sub substrate 7 whenever receiving data indicating the progress state of the amusement from the main substrate 3.

Further the sub main substrate 5 performs production control to flash on and off the notice lamp 31 according to the information of the trigger table, etc. when receiving the data (command) from the main substrate 3.

Figure 3:
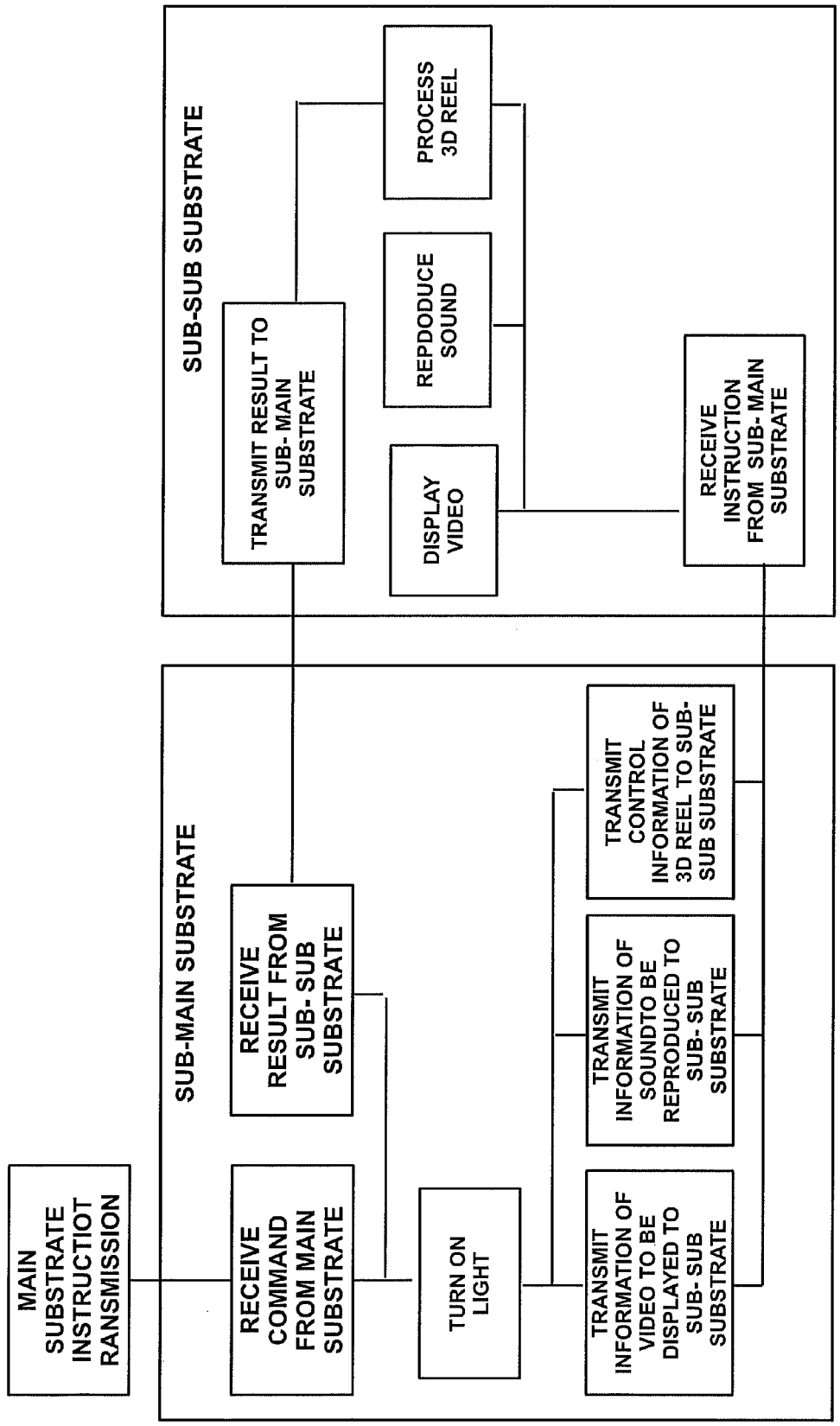
FIG. 3 is a drawing for explaining overview of the processing of the sub main substrate 5 and the sub-sub substrate according to the data output from the main substrate.

FIG. 3 is a drawing for explaining overview of the processing of the sub main substrate 5 and the sub-sub substrate 7 according to the data output from the main substrate 3.

The sub main substrate 5 generates the production indication data based on the production pattern (trigger table) decided according to the wining symbol combination (main lottery) for amusement to transmit this to the sub-sub substrate 7 when receiving the data indicating the progress state of the amusement from the main substrate 3. Namely the sub main substrate 5 transmits information indicating video of animation, etc. to be displayed on the display 35, information indicating audio to be reproduced by the speaker 37 and control information of a three dimensional sub-reel (3D reel) to be displayed on the display 35 as video to the sub-sub substrate 7. Further the sub main substrate 5 performs control of flash on and off of the notice lamp 31 as a part of the production.

The sub-sub substrate 7 controls display of the video of animation, etc. in the display 35 according to the production indication data received, reproduction of effective sound in the speaker 37, and rotation of the sub-reel (3D reel) displayed on the display 35 when receiving the production indication data from the sub main substrate 5. The sub-sub substrate 7 transmits the data indicating a stop symbol (result of combination of symbols of sub-reel which is stop status) to the sub main substrate 5 when the sub-reel (3D reel) become stop from rotation state in the display 35.

The sub main substrate 5 replaces the production pattern according to the stop symbol of the sub-reel (3D reel) when receiving the data indicating stop symbol of the sub-reel (3D reel). For example the sub main substrate 5 selects a new trigger table from the plurality of triggers stored in the storage apparatus according to the stop symbol of the sub-reel (3D reel).

Figure 4:
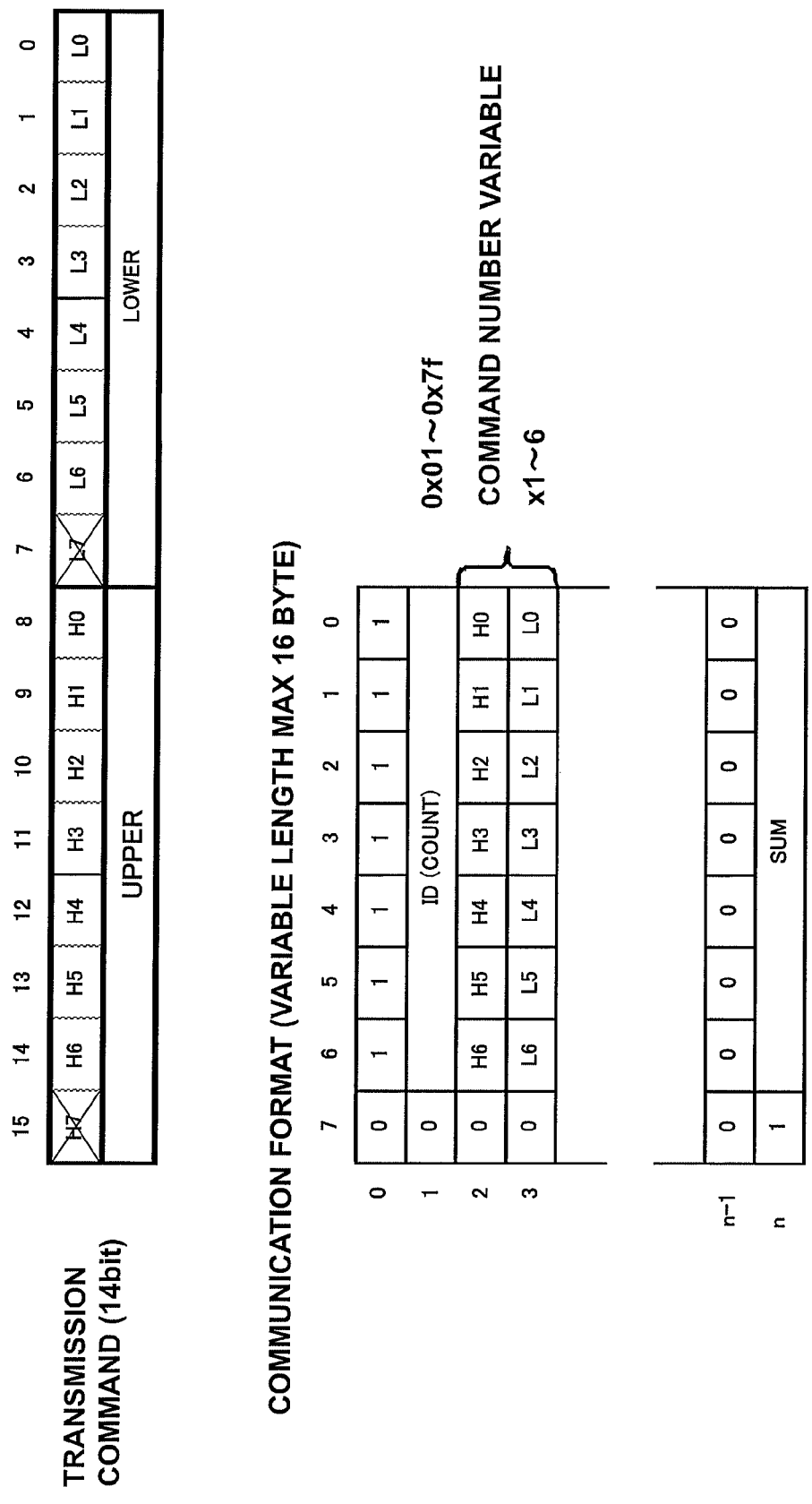
FIG. 4 is a drawing for explaining an example of the format of the data (command) transmitted from the sub main substrate to the sub-sub substrate.

FIG. 4 is a drawing for explaining an example of the format of the data (command) transmitted from the sub main substrate 5 to the sub-sub substrate 7. As shown in FIG. 4, data transmitted from the sub main substrate 5 to the sub-sub substrate 7 may be variable length. Note that, the data instructing start and stop of the rotation, etc. which relatively high speed processing are demanded may be fixed length.

On the other hand, FIG. 5 is a drawing for explaining an example of the format of the data (command) transmitted from the sub-sub substrate 7 to the sub main substrate 5. As shown in FIG. 5, the data transmitted from the sub-sub substrate 7 to the sub main substrate 5 may be fixed length.

As a command transmitted from the sub main substrate 5 to the sub-sub substrate 7, there are for example a basic common display command (command for error, setting change, stop button request and setting confirmation), a timing instruction command (a command relating to operation of main-reel side. For example command for a bet, a rotation start of main-reel, stop of main-reel of left, middle and right), a medal relating command (a command relating a pieces of credit, insert and paying out), a sound relating command (a command for controlling output and stop of sound), 3D reel relating command (a sub-reel rotation start instruction, a left sub-reel stop instruction, a middle sub-reel stop instruction, a right sub-reel stop instruction, a notice of random number for lottery, a notice of symbol combination for sub-reel production and a reel stop order), a production command according to the model (a command for managing productions which are different for each models), a special operation command (a command relating outside input for menu display use. For example an outside input button operation command, a touch panel operation command) and a system command (a command change stop symbols of 3D reel and a command for enlarging reels, etc.). The sub-sub substrate 7 controls the screen displaying on the display 35 and the output of effective sound on the speaker 37.

On the other hand, as a command transmitted from the sub-sub substrate 7 to the sub main substrate 5, for example there are a command relating to interactive communication (a system command when performing communication), a status command of production of each models (a command outputting status as a result of the production) and a 3D reel result command (a command transmitting information of symbol combination which is established and a established line).

Here data (a symbol combination data for production, a random data, a stop order judgment data, a sub-reel rotation start instruction data and sub-reel stop instruction data) will be explained in detail.

(1) A Production Use Symbol Combination Data and a Random Data

The sub main substrate 5 sets a symbol combination for deciding a combination of the symbols (stop symbol) at the time of stopping the sub-reel (a production use symbol combination of the sub-reel) based on the wining symbol combination for amusement in order to appear a symbol having a relation with the wining prize for amusement which is drawn by the lottery draw unit 15 in the sub-reel (3D reel) of the display 35. For example a data table (a symbol combination conversion table) in which a plurality of symbol combinations for amusement (a main lottery) and a plurality of symbol combinations of production of the sub-reels (3D lottery) are associated is stored in the storage apparatus. The sub main substrate 5 obtains a production use symbol combination data indicating a symbol combination of the production which is associated with the wining symbol combination indicated by the wining symbol combination data based on the symbol combination transformation data after receiving the wining symbol combination data from the main substrate 3. The sub main substrate 5 transmits the production use symbol combination data obtained based on the symbol combination conversion table to the sub-sub substrate 7.

Further, in the present embodiment, one wining symbol combination is associated with a plurality of production use symbol combinations in the symbol combination conversion table. Therefore the sub main substrate 5 generates the random data for selecting one production use symbol combination by drawing from a plurality of production use symbol combinations and transmits this to the sub-sub substrate 7 with the production use symbol combination data.

The sub-sub substrate 7 specifies a plurality of production use symbol combinations associated with the wining symbol combination based on the production use symbol combination data received from the sub main substrate 5. Then the sub-sub substrate 7 controls (pulling control, kicking off control) the stop symbol combination so as to appear stop symbol according to the specified production use symbol combination based on the production use symbol combination data and the random data.

Figure 7:
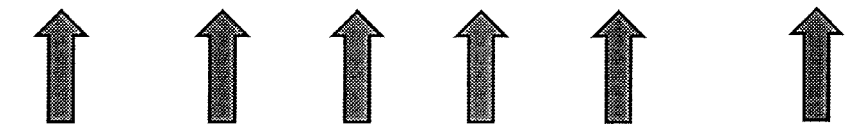
FIG. 7 is a drawing for explain the conversion processing from a main lottery to a 3D lottery.
Figure 8:
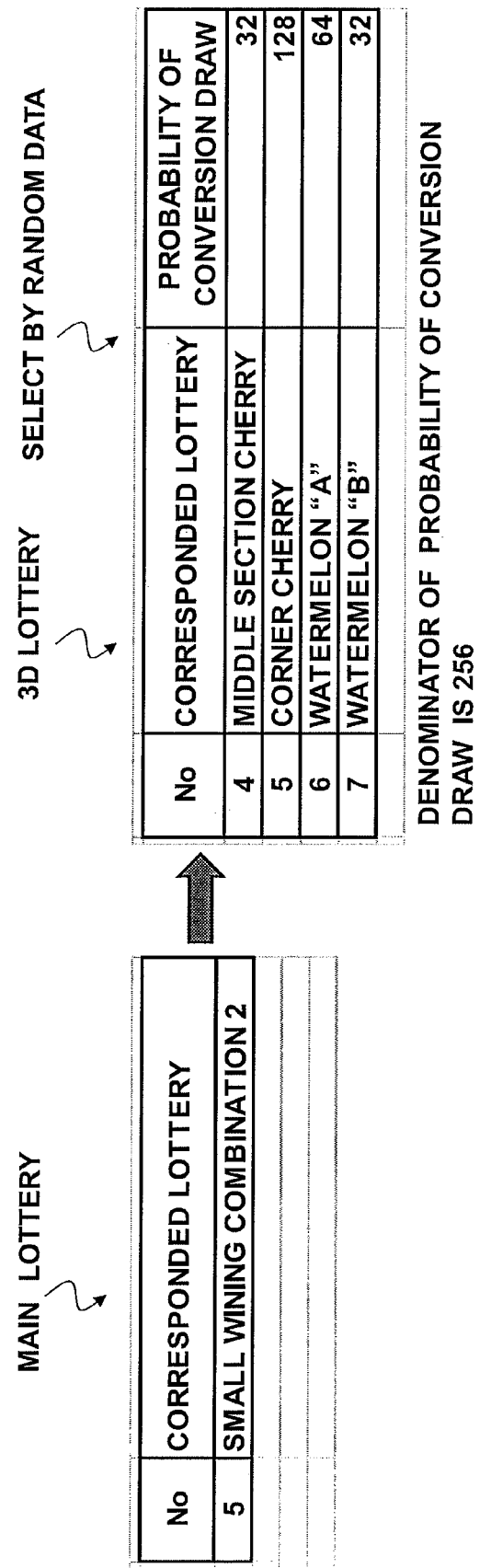
FIG. 8 is a drawing for explain the conversion processing from a main lottery to a 3D lottery.

FIG. 6 to FIG. 8 are drawings for explain the conversion processing from the wining symbol combination (main lottery) to the production use symbol combination (3D lottery).

In the example of FIG. 6 to FIG. 8, a plurality of production use symbol combinations are assigned to one wining symbol combination (main lottery).

Further as shown in FIG. 8, a probability of wining is assigned with each of the plurality of production use symbol combinations (3D lottery) in the stop control table for production (FIG. 13). In example of FIG. 8, the probability of wining of the "middle section cherry" is "32/256", the probability of wining of the "kado cherry" is "128/256", the probability of wining of the "watermelon A" is "64/256" and the probability of wining of the "watermelon B" is "32/256".

The sub main substrate 5 obtains the production use symbol combination data (a flag number in FIG. 19) for designating a plurality of production use symbol combination (3D lottery) corresponding the wining symbol combination and transmit this to the sub-sub substrate 7 when receiving the wining symbol combination data from the main substrate 3. For example when the wining symbol combination is a "small symbol combination 2", the sub main substrate 5 transmits the production use symbol combination data (flag number) for designating four production use symbol combinations ("middle section cherry", "corner cherry", "watermelon A" and "watermelon B") corresponding to the "small symbol combination 2" to the sub-sub substrate 7.

Further, the sub main substrates 5 generates the random data for selecting one among the plurality of the production use symbol combinations (3D lottery) and transmits this to the sub-sub substrate 7. For example when the probability of wining is set as shown in FIG. 8, the sub main substrate 5 generates the random data having a value between 0 and 255 and transmits to the sub-sub substrate 7. The sub-sub substrate 7 assigns range of numerical value "0 to 311" to the "middle cherry", "32 to 159" to the "corner cherry", "160 to 223" to the "watermelon A", "22 to 255" to the "watermelon B". The sub-sub substrate 7 specifies one production use symbol combination among four production use symbol combination ("middle section cherry", corner cherry", "watermelon A" and "watermelon B") according to a range of numerical value in which the random data belongs. For example when the random data is "200", the "watermelon A" is specified as the production use symbol combination among four production use symbol combinations.

(2) Stop Order Judgment Data

As the symbol combination for amusement (main lottery) drawn by the lottery draw unit 15, there is a symbol combination defining whether it is wining symbol combination or not according to the order when stopping the three main-reels (left, middle and right). Therefore the sub main substrate 5 judges the reel stop order agrees with the order defined by the wining symbol combination and transmits data indicating the result of judgment (stop order judgment data) to the sub-sub substrate 7. Further the sub main substrate 5 may transmit the stop order judgment data indicating whether or not it agrees with the reel stop order defined in the production use symbol combination independently from the wining symbol combination.

(3) Sub Reel Rotation Start Instruction Data and Sub-Reel Stop Instruction Data

Further the sub main substrate 5 when receiving data instruction rotation start of the main-reel from the main substrate 3 transmits data (sub-reel start instruction data) for starting rotation in the sub-reel of the display 35 also to the sub-sub substrate 7.

Further the sub main substrate 5, when receiving data instructing rotation stop of either of main-reels from the main substrate 3, transmits data for stopping rotation of the sub-reel corresponding to this also to the sub-sub substrate 7. For example, the sub main substrate 5 transmits sub-reel instruction data for stopping the left sub-reel when receiving stop instruction data of the left main-reel, stopping the middle sub-reel when receiving stop instruction data of the middle main-reel, and stopping the right sub-reel when receiving stop instruction data of the right main-reel.

[Sub-Sub Substrate 7]

The sub-sub substrate 7 controls displayed pictures on the display 35 and sound outputted at [27] according to the production indication data received from the sub-main substrate 8. For instance, the sub-sub substrate 7 reads the image data and the sound data correspond to the production indication data from the video storage unit 74 (FIG. 9), then generates both the video signal and the audio signal correspond to thereto and supply to the display 35 and the speaker 37.

In addition, the sub-sub substrate 7 displays images of the sub-reel, which spin and stop, on the display 35 according to control data of sub-reel (3D reel) such as the production use symbol combination data, the random number data, the stop order judgment data, the sub-reel rotation start instruction data and sub-reel stop instruction data, received from the sub-main substrate 8.

Moreover, the sub-sub substrate 7 transmits the information about the combination of symbols in the sub-reel (stop symbol patterns) on the display 35 to the sub main substrate 5.

Figure 9:
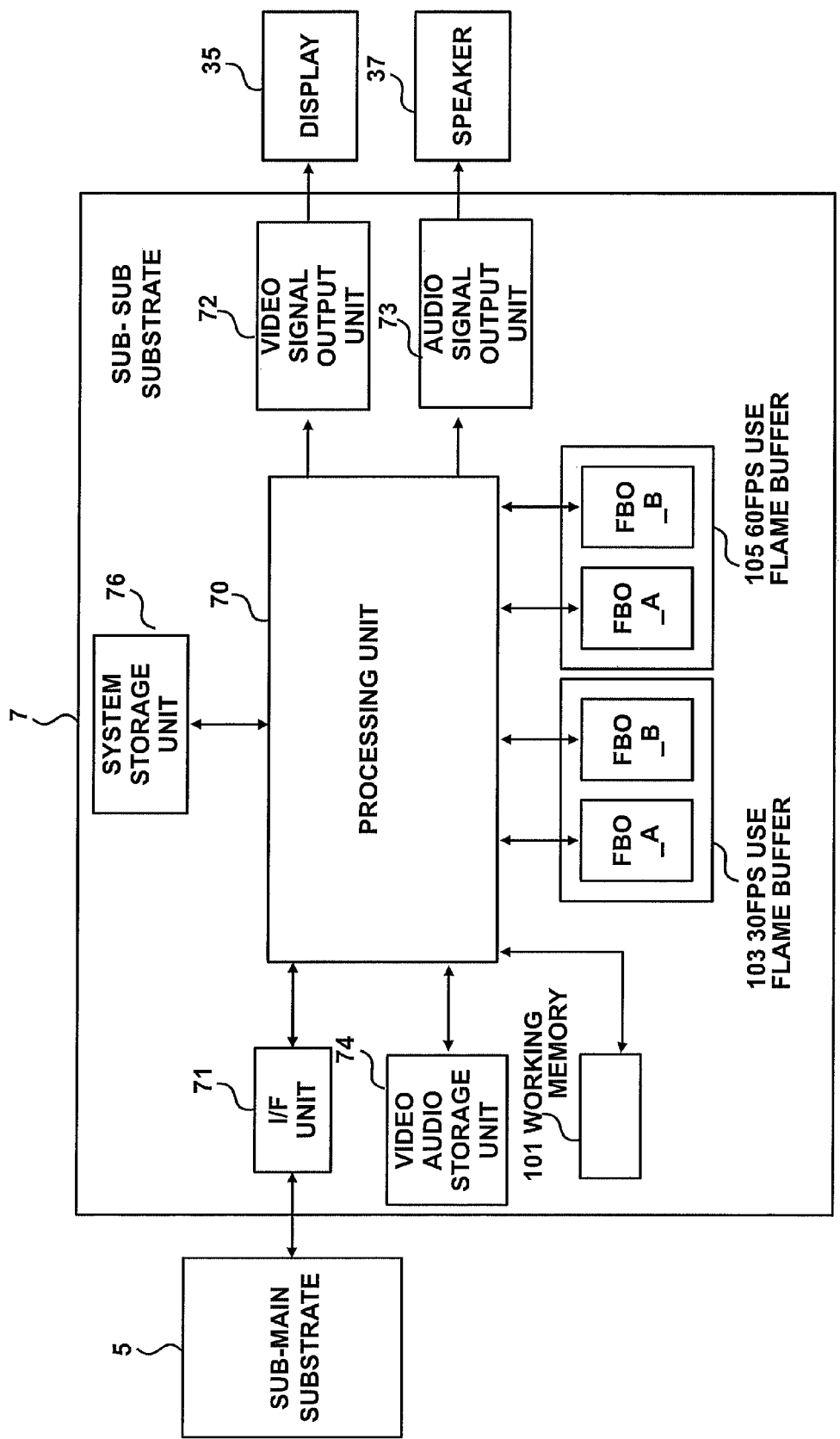
FIG. 9 is a drawing showing an example of the overall structure of the sub-sub substrate 7.

FIG. 9 is a drawing showing an example of the overall structure of the sub-sub substrate 7. The sub-sub substrate 7 shown in FIG. 9 possesses the processor 70, the communication interface 71, the video signal output unit 72, the system storage unit 76, the working memory 101, the 30 (frames per second) fps use flame buffer 103, and the 60 fps use flame buffer 105.

Processing content of the processor 70 is described in the program.

The communication interface 71 is a circuit to exchange the data between the sub main substrate 5, The communication interface 71 receives the data from the sub main substrate 5 and transmits the data to the sub main substrate 5.

The video signal output unit 72 generates video signals of the predetermined signal format in accordance with the image data supplied from the processor 70, and input to the display 35.

The audio signal output unit 73 generates sound signals with adjusted amplitude and pulse density in accordance with the sound data supplied from the processor 70, and input to the speaker 37.

The video storage unit 74 stores the video data used to configure the screen of the display 35 and the sound data used to output a sound from the speaker 37. The video data and sound data stored in the video storage unit 74 are associated with identification information respectively. The sub-sub substrate 7 reads the video data and the sound data from the video storage unit 74 by referencing the identification information included in the production indication data transmit from the sub main substrate 5.

In addition, the video storage unit 74 stores each image data in association with the frame rate setting data. As described below, the sub-sub substrate 7 sets the frame rate of the video display of the display 35 according to the frame rate setting data.

Moreover, the device stores image data of several symbols disposed on the peripheral surface of sub-reel shown on the display 35.

The 30 fps use flame buffer 103 and the 60 fps use flame buffer 105 are memory to store the video information shown on the display 35 in each picture unit, store one or more screens.

In this present embodiment, the 30 fps use flame buffer 103 is an example of the memory group for the first rate the present invention, and the 60 fps use flame buffer 105 is an example of the memory group of the second rate in the present invention.

The system storage unit 76 stores programs for executing the processes in the processor 70 and data used for the processing. For instance, the system storage unit 76 stores the stop control table for production shown in FIG. 19, the first top table and the second stop table shown in FIG. 20, third stop table shown in FIG. 25, the virtual stop buffer (stop judgment table) shown in FIG. 18 and FIG. 21 and so on. These table data will be explained afterwards.

The processor 70 is a circuit responsible for the overall processes in the sub-sub substrate 7. The processor 70 performs processing of the image to be displayed on the display 35, and processing of the audio to be output from the speaker 37 according to the instructions of a program stored in the system storage unit 76.

Furthermore, the processor 70 structures the pictures on the frame buffer based in the image data stored in the video storage unit 74 in each frame period by using the working memory 101, the 30 fps use flame buffer 103 and the 60 fps use flame buffer 105 as mentioned later, when an image corresponding to the production indication data transmit from the sub main substrate 5 is displayed on the display 35.

The 30 fps use flame buffer 103, for example, is used to render the background images.

Moreover, the 60 fps use flame buffer 105 is used to render 3D reels.

Figure 10:
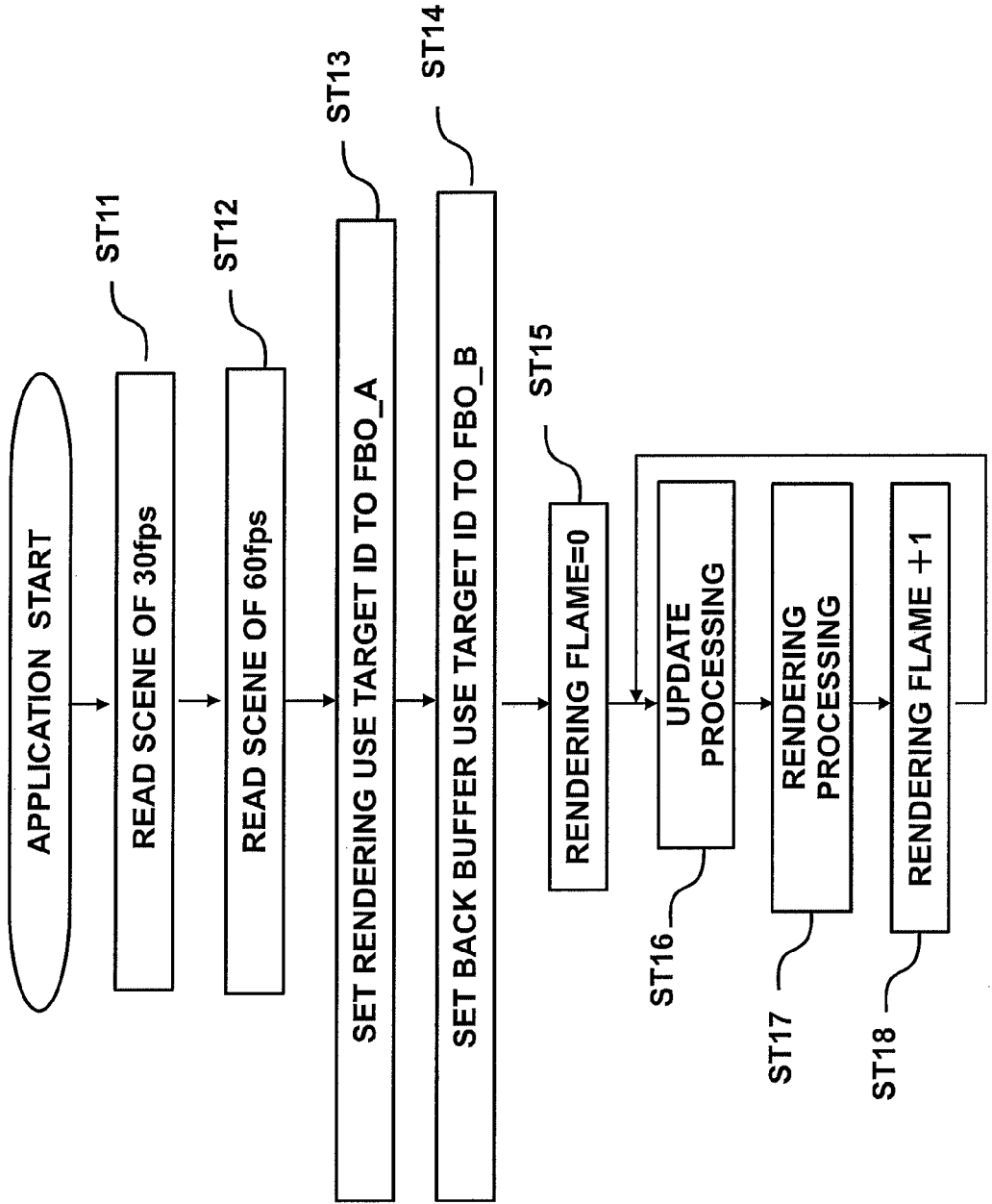
FIG. 10 is a flowchart for explaining an image display processing using flame buffer.
Figure 11:
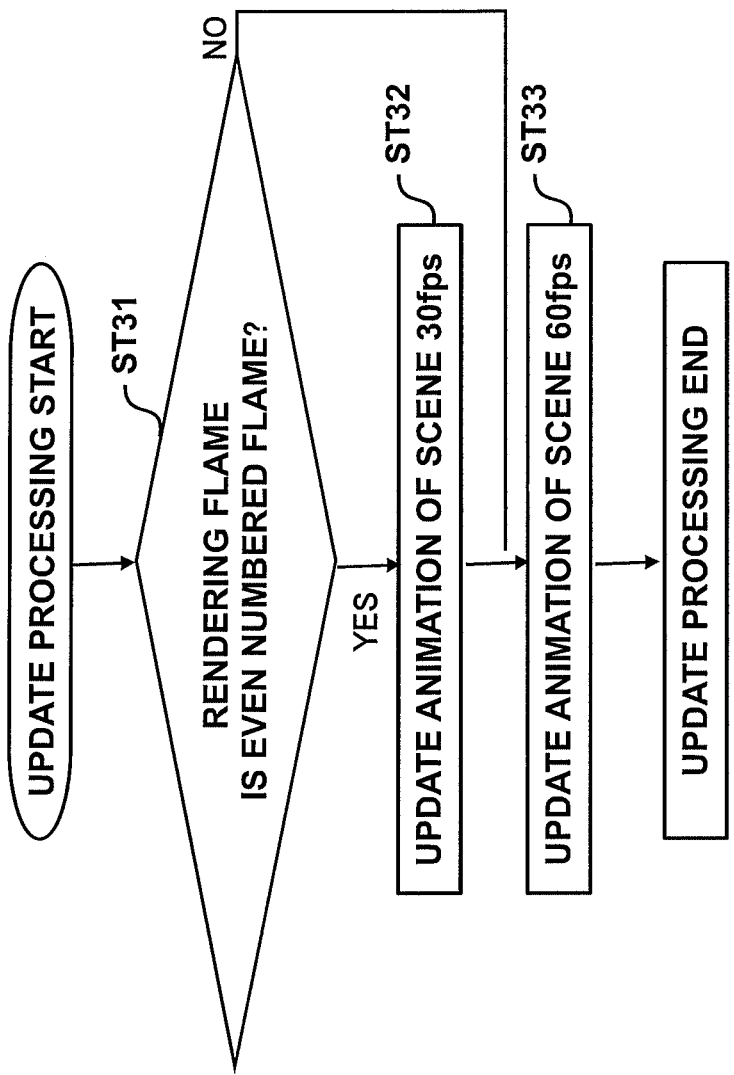
FIG. 11 is a flowchart for explaining an image display processing using flame buffer.
Figure 12:
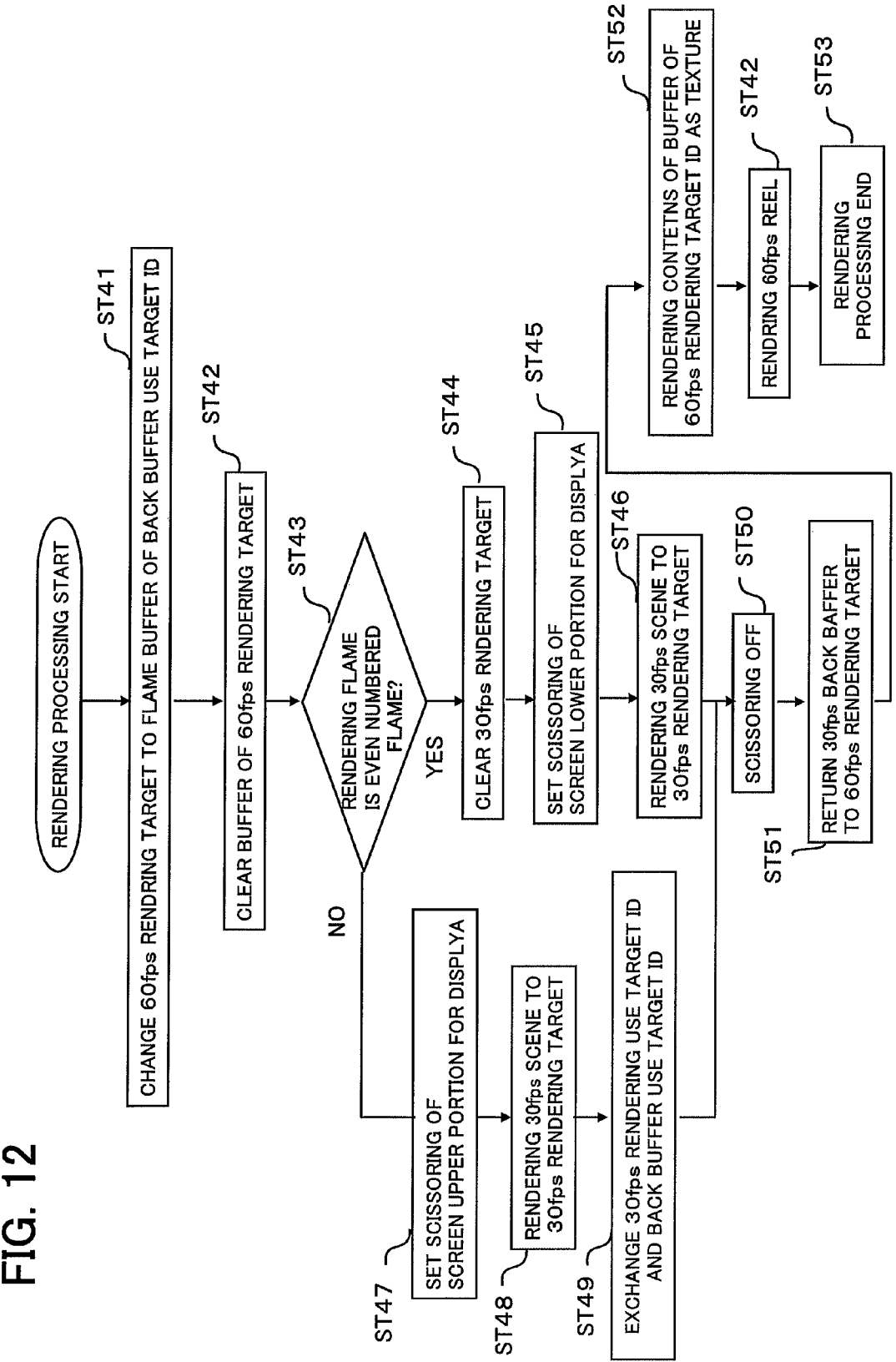
FIG. 12 is a flowchart for explaining an image display processing using flame buffer.

Step ST11:

FIG. 10 to FIG. 12 are flow charts to explain the process of image display by using frame buffer.

The processor 70 reads the frame data of the scene to be displayed at 30 fps from the video storage unit 74 and input to the working memory 101.

Step ST12:

The processor 70 reads the frame data the scene to be displayed at 60 fps from the video storage unit 74, and input to the working memory 101.

Step ST13:

The processor 70 sets the frame buffer FBO_A of both 30 fps use flame buffer 103 and 60 fps use flame buffer 105 as for rendering target.

The said setting is realized by rewriting a predetermined flag data and so on.

Step ST14:

The processor 70 sets the frame buffer FBO_B of both the 30 fps use flame buffer 103 and the 60 fps use flame buffer 105 as for back buffer (read target).

The said setting is realized by rewriting a predetermined flag data and so on.

Step ST15:

The processor 70 sets "0" in the identification number data of the rendering frame.

Step ST16:

The processor 70 performs updating processes of the scene of rendering target.

FIG. 11 is a flowchart to explain updating processes of the scene of rendering target by the processor 70.

As shown in FIG. 11, for instance, the processor 70 determines whether the 60 fps frame data which next scene of rendering target is an even numbered frame or not based on the aforementioned identification number (step ST31).

When the frame data is determined as an even numbered frame, the processor 70 reads the image data (animation) of the scene of the 30 fps from the video storage unit 74, then updates the image data of the 30 fps in the working memory 101 (STEP ST32).

On the other hand, when the frame data is determined as an even numbered frame, the processor 70 reads the image data (animation) of the scene of the 60 fps from the video storage unit 74, then updates the image data of the 60 fps in the working memory 101 (STEP ST33).

STEP ST17

The processor 70 performs the rendering processes. This process will be described in detail below.

STEP ST18

The processor 70 increments (or decrements) the identification number data of the rendering frame by 1.

STEP ST41:

Hereafter, step ST17 shown in FIG. 10 will be explained in detail.

FIG. 11 is a flowchart to explain the process of rendering. The processor 70 sets a frame buffer for back buffer from the frame buffer FBO_A or FBO_B in the 60 fps use flame buffer 105 for rendering target.

STEP ST42:

The processor 70 clears the frame buffer FBO_A and FBO_B of the 60 fps use flame buffer 105 for rendering target.

STEP ST43:

For instance, the processor 70 determines whether the 60 fps frame data which next scene of rendering target is an even numbered frame or not based on the aforementioned identification number.

STEP ST44:

The processor 70 clears frame buffer for rendering from the frame buffer FBO_A or EBO_B in the 30 fps use flame buffer 103 when the frame data is determined as an even numbered frame at the step ST43.

STEP ST45:

The processor 70 performs setting for scissoring the lower half of the screen according to the image data stored in the frame buffer for rendering in the 30 fps use flame buffer 103.

STEP ST46:

The processor 70 renders the image data of the scene corresponding 30 fps that read from the working memory 101 on the frame buffer for rendering target in the 30 fps use flame buffer 103. At this time, since the lower half of the screen is scissoring, only the upper half of the screen is rendered in the frame buffer.

STEP ST47:

The processor 70 performs setting for scissoring the upper half of the screen according to the image data stored in the frame buffer for rendering in the 30 fps use flame buffer 103 when the frame data is determined as an odd numbered frame at the step ST43.

STEP ST48:

The processor 70 renders the image data of the scene that read from the working memory 101 on the frame buffer for rendering target in the 30 fps use flame buffer 103. At this time, since the upper half of the screen is scissoring, only the lower half of the screen is rendered in the frame buffer.

STEP ST49:

The processor 70 sets the frame buffer for rendering target of the 30 fps use flame buffer 103 as a back buffer. Also, the processor 70 sets the frame buffer for back buffer as rendering target.

STEP ST50:

The processor 70 sets off a scissoring.

STEP ST51:

The processor 70 reads the frame buffer for back buffer of the 30 fps use flame buffer 103 and writes to the frame buffer for rendering target of the 60 fps use flame buffer 105.

STEP ST52:

The processor 70 renders image data of the frame buffer for rendering target in the 60 fps use flame buffer 105 as a texture.

STEP ST53:

The processor 70 renders the image data, correspond to the scene of 60 fps, which read from the working memory 101 on the frame buffer for rendering target of the 60 fps use flame buffer 105.

Hereinafter, the example of the specific operation will be explained with reference to FIG. 13A to FIG. 16.

Figure 13A:
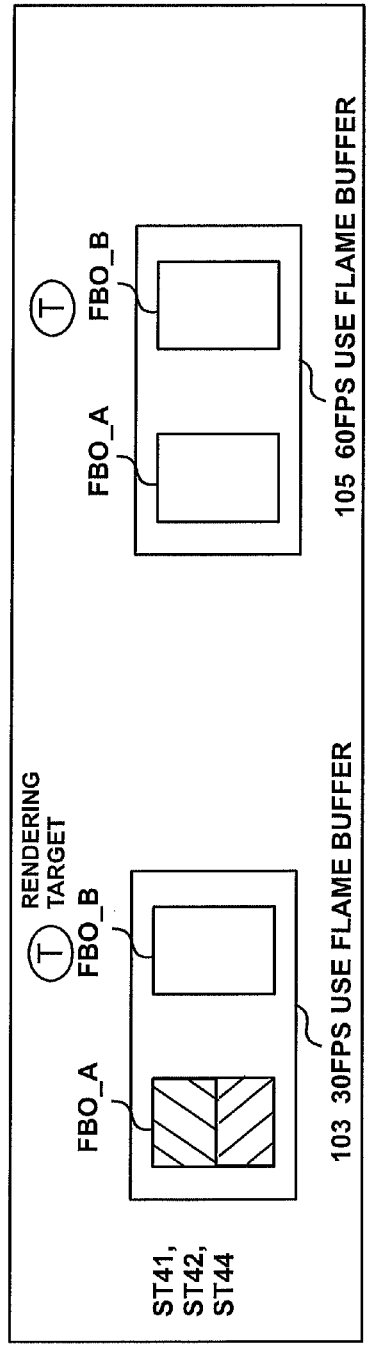
FIGS. 13A-13C are flowcharts for explaining a concrete example of an image display processing using flame buffer.

As shown in FIG. 13A, the processor 70 sets the frame buffer FBO_B of the 60 fps use flame buffer 105 as for rendering target (Step ST41).

Moreover, the processor 70 clears the frame buffer FBO_B of the 60 fps use flame buffer 105 for rendering target.

In addition, the processor 70 clears frame buffer FBO_B for rendering in the 30 fps use flame buffer 103 when the frame data is determined as an even numbered frame.

Figure 13B:
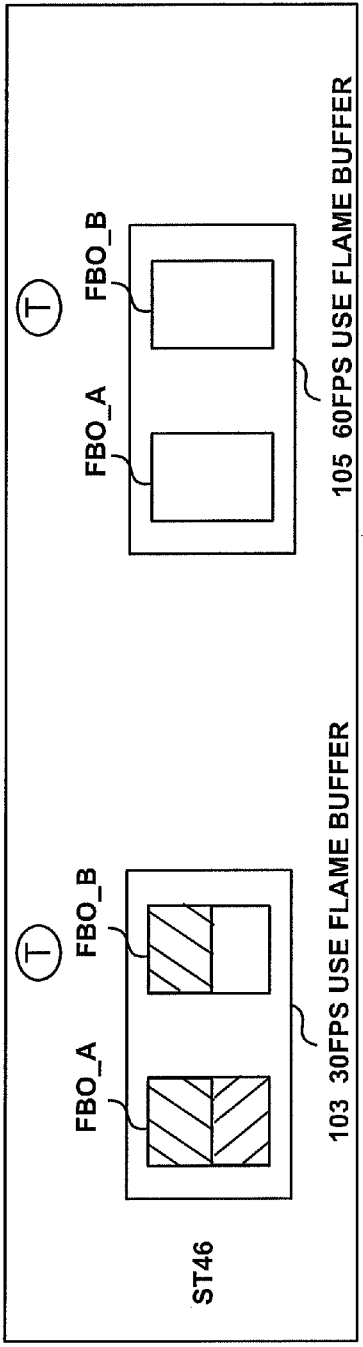

Next, as shown in FIG. 13B, the processor 70 performs setting for scissoring the lower half of the screen according to the image data stored in the frame buffer FBO_B for rendering target in the 30 fps use flame buffer 103.

Then the processor 70 renders the image data, correspond to the scene of 30 fps, which read from the working memory 101 on the 30 fps use flame buffer 103 FBO_B (STEP ST46). At this time, since the lower half of the screen is scissoring, only the upper half of the screen is rendered in the frame buffer.

Figure 13C:
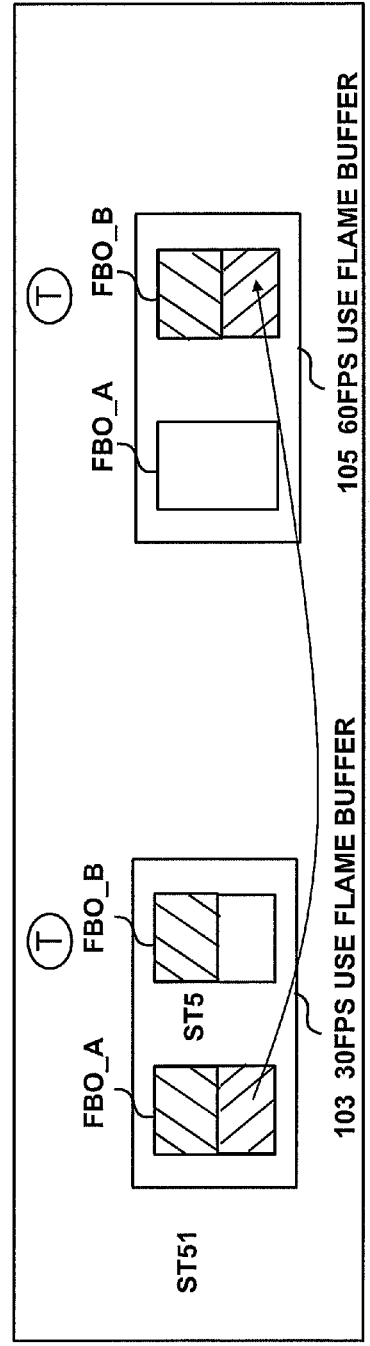

Then, as shown in FIG. 13C, the processor 70 reads the frame buffer FBO_A for back buffer of the 30 fps use flame buffer 103 and writes to the frame buffer FBO_B for rendering target of the 60 fps use flame buffer 105.

Figure 14A:
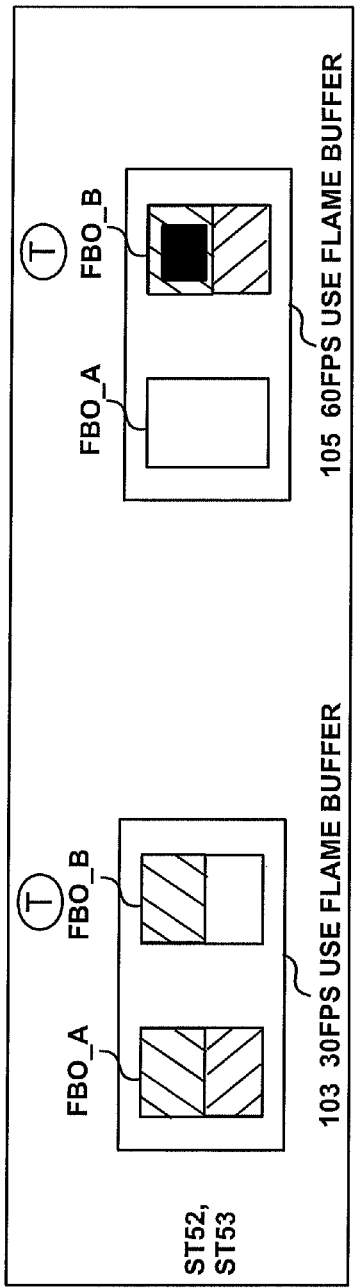
FIGS. 14A-14C are flowcharts for explaining a concrete example of an image display processing using flame buffer.

Next, as shown in the FIG. 14A, the processor 70 renders the image data on the frame buffer FBO_B for rendering target in the 60 fps use flame buffer 105 as a texture (STEP ST52). Moreover, the processor 70 renders the image data, correspond to the scene of 60 fps which read from the working memory 101 on the frame buffer FBO_B for rendering target of the 60 fps use flame buffer 105.

Figure 14B:
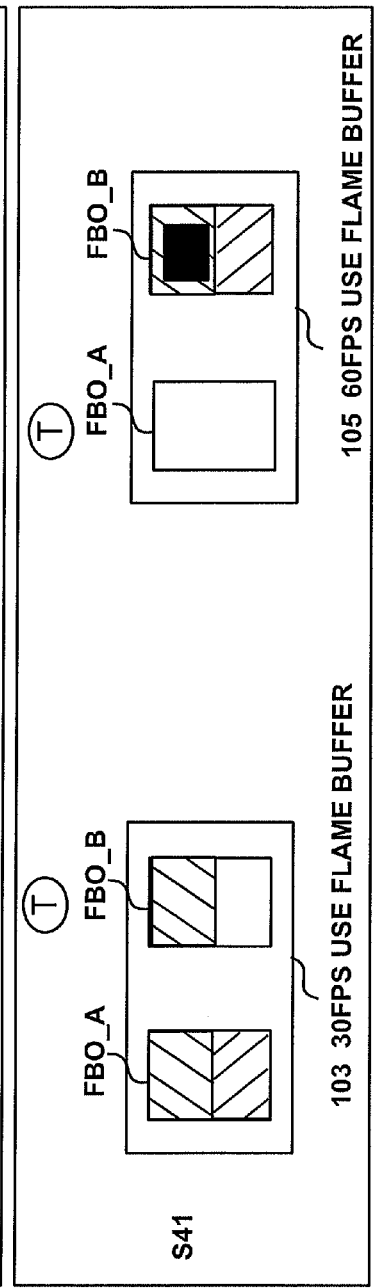

Next, as shown in FIG. 14B, the processor 70 sets the frame buffer FBO_A of the 60 fps use flame buffer 105 as rendering target (Step ST41).

Figure 14C:
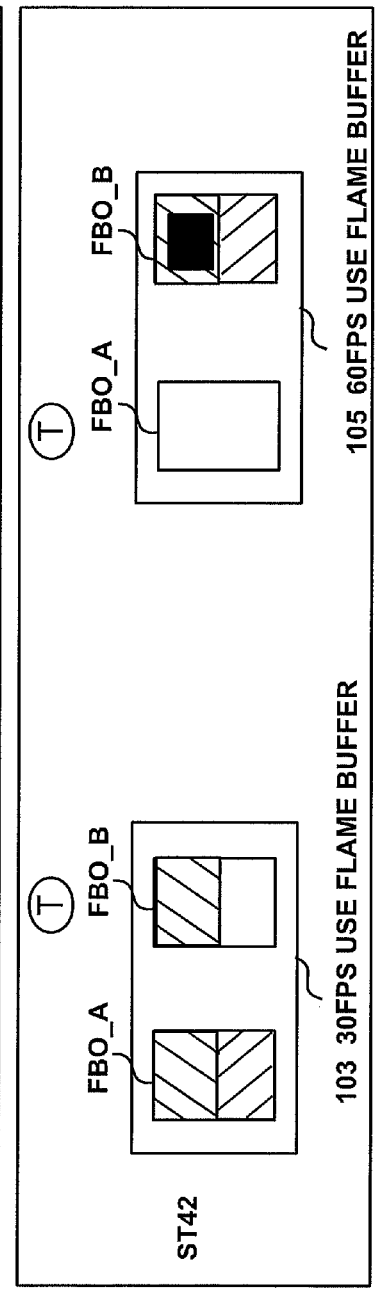

Next, as shown in the FIG. 14C, the processor 70 clears the frame buffer FBO_A of the 60 fps use flame buffer 105 for rendering target. (Step ST42).

Figures 15A, 15B, 15C:
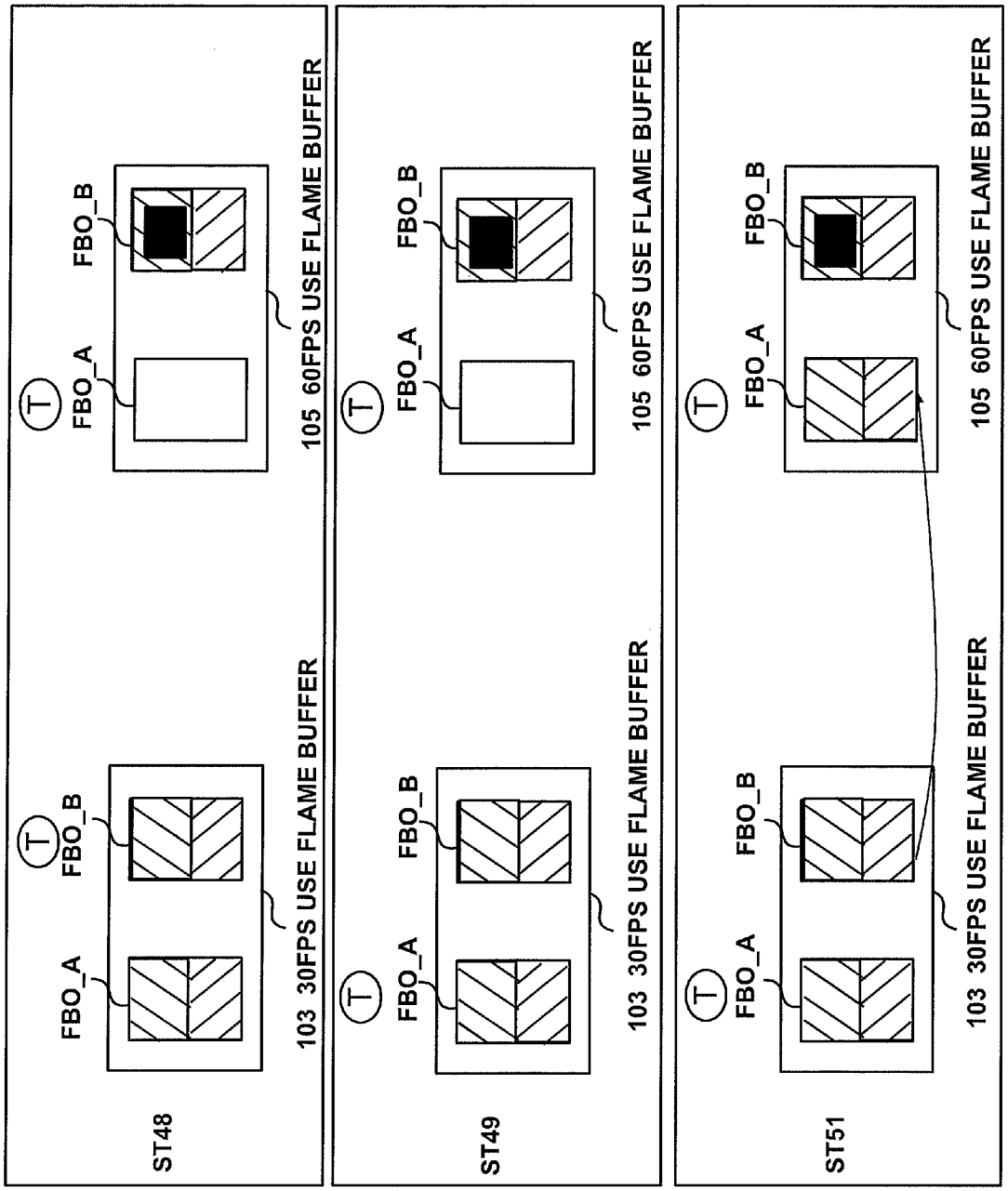
FIGS. 15A-15C are flowcharts for explaining a concrete example of an image display processing using flame buffer.

Next, as shown in FIG. 15A, the processor 70 renders the image data, correspond to the scene of 30 fps which read from the working memory 101 on the frame buffer FBO_B for rendering target of the 30 fps use flame buffer 103. At this time, since the upper half of the screen is scissoring, only the lower half of the screen is rendered in the frame buffer FBO_B.

Next, as shown in FIG. 15B, the processor 70 sets the frame buffer FBO_B for rendering target of the 30 fps use flame buffer 103 as a back buffer. Furthermore, the processor 70 sets the frame buffer FBO_A for back buffer as rendering target (STEP ST49).

Then, as shown in FIG. 15C, the processor 70 reads the frame buffer FBO_B for back buffer of the 30 fps use flame buffer 103 and writes to the frame buffer FBO_A for rendering target of the 60 fps use flame buffer 105.

Figure 16:
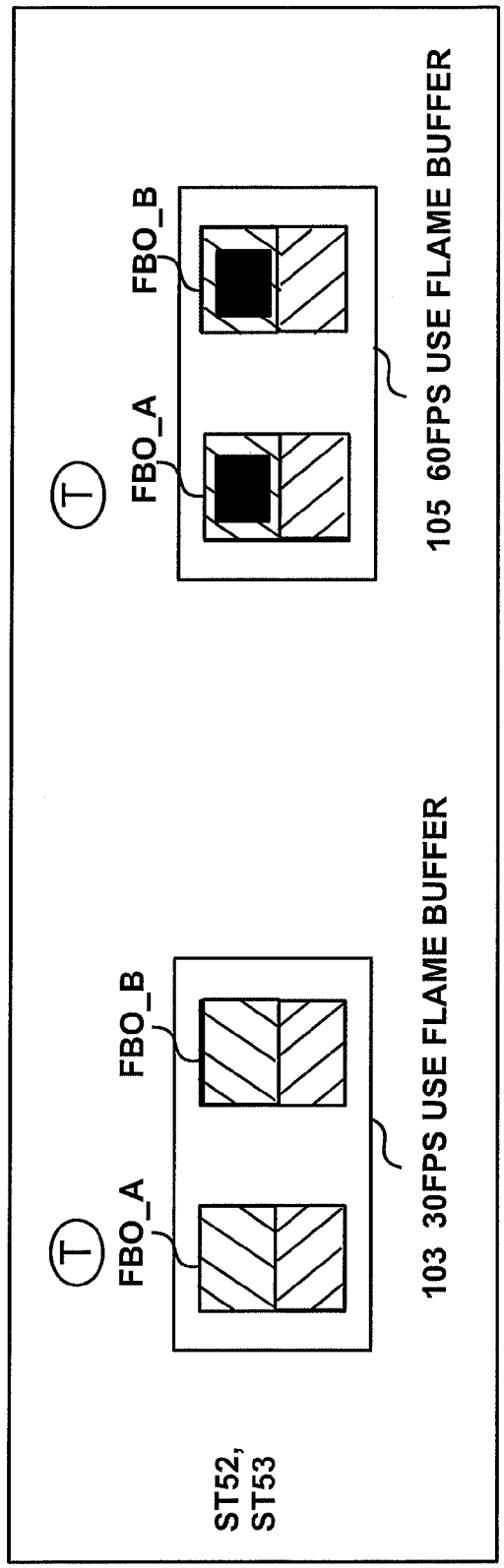
FIG. 16 is a flowchart for explaining a concrete example of an image display processing using flame buffer.

As shown in the FIG. 16, the processor 70 renders the image data on the frame buffer FBO_A for rendering target in the 60 fps use flame buffer 105 as a texture (STEP ST52). Moreover, the processor 70 renders the image data, correspond to the scene of 60 fps which read from the working memory 101 on the frame buffer FBO_A for rendering target of the 60 fps use flame buffer 105.

As stated above, when compared to rendering the entire image of 30 fps in both even numbered frames and odd numbered frames of 60 fps, by rendering lower half of 30 FPS in the processing of even numbered frame of 60 fps and rendering upper half of 30 fps in the processing of odd numbered frame, the processing load of the processor 70 can be reduced to half.

Thus, by delaying image rendering, the image quality degradation can be prevented, therefore stable high-quality images can be displayed.

The 30 fps use flame buffer 103, for example, is used to render the background images.

Moreover, the (106) is used to render 3D reels.

Furthermore, the example explained by using aforementioned FIG. 12-26, as shown in FIG. 15C, the processor 70 reads the frame buffer FBO_B for back buffer of the 30 fps use flame buffer 103 and writes to the frame buffer FBO_A for rendering target of the 60 fps use flame buffer 105 (STEP ST51), afterwards, as shown in FIG. 16, the processor 70 renders the image data on the frame buffer FBO_A for rendering target in the 60 fps use flame buffer 105 as a texture (STEP ST52).

Figure 17:
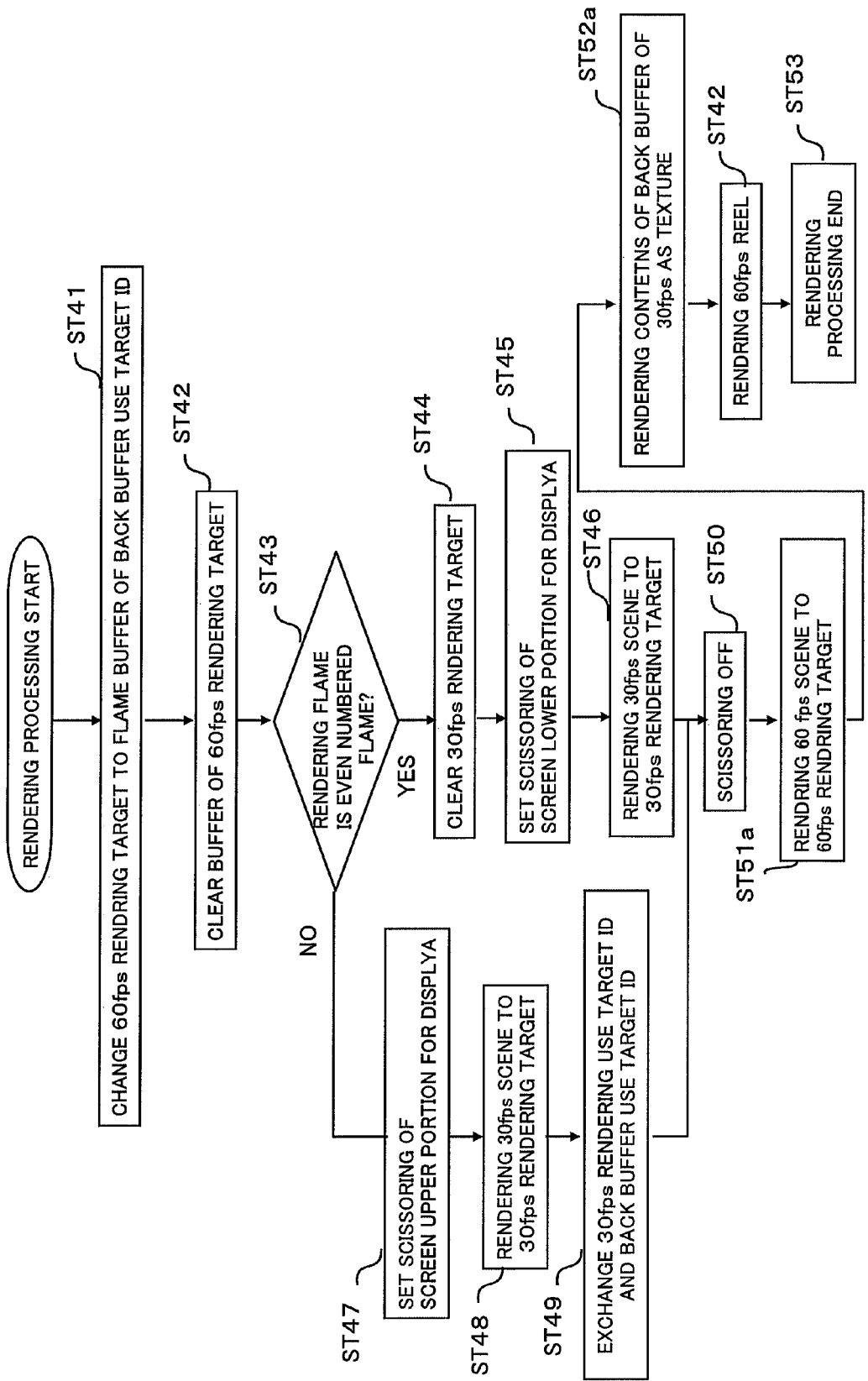
FIG. 17 is a flowchart for explaining the other example of an image display processing using flame buffer.

As shown in FIG. 17, the processor 70 may render the image data on the frame buffer FBO_A for rendering target in the 60 fps use flame buffer 105 as a texture, then read the frame buffer FBO_B for back buffer of the 30 fps use flame buffer 103. Afterwards the processor 70 may render to the frame buffer FBO_A for rendering target of the 60 fps use flame buffer 105 as a texture (STEP ST52*a*).

Moreover, the processor 70 uses the 60 fps use flame buffer 105 to render the image of sub-reel rotation on the display 35 in the area that relatively high frame rate is required. And the 30 fps use flame buffer 103 is used to render the image on the area with no high frame rates required such as background.

Therefore, it is possible to render high frame rate in the area that the rotating image of sub-reel is displayed, and the video of the rotating sub-reel can be seen much smoother and more realistic. In addition, by reducing the frame rate of the image displayed on the other area, it is possible to prevent the occurrence of drop frames, even when displaying the complex animations which has a lot of information as well as heavy load of image processing.

When sub-reel rotation start instruction data is entered from the sub main substrate 5, the processor 70 starts to rotate the sub-reel displayed on the display 35.

Specifically, the processor 70 acquires the rotation angle of the sub-reel that should rotate at a predetermined speed at every frame period after the processor 70 enters the sub-reel rotation start instruction data acquired from the sub main substrate 5. On the basis of the image data of a plurality of types of symbols will be stored in the video storage unit 74 and the aforementioned rotation angle acquired at every frame period, when the rotation angle is in the angle acquired above, the processor 70 constitutes the image of the reel body having predetermined three-dimensional shape that the plurality of types of symbols mapped on the surface of the 60 fps use flame buffer 105 in each frame period of left, middle and right sub-reel. On the basis of the image of aforementioned reel body configured to the frame buffer, the processor 70 updates the video of sub-reel on the display 35 at every frame period. Thus, the video of the rotating sub-reel at the predetermined speed is displayed on the display 35.

In addition, as the processor 70 receives stop instruction data of the reel on the left, middle or right from the sub main substrate 5, the processor 70 stops rotation of the corresponding reel. In this case, the processor 70 controls stop position of the sub-reel to stop with the symbols corresponding the timing of receiving sub-reel stop instruction data and the production use symbol combination specified by the production indication data and random number data.

Namely, when the processor 70 receives the sub-reel stop instruction data from the sub main substrate 5 while the image of sub-reel rotation is displayed, determines the rotation angle to stop the stop target sub-reel (position of the symbol), and stops updating the image of stop target sub-reel in the rotation angle (position of the symbol) depends on the rotation angle of the stop target sub-reel in the reception timing of the sub-reel stop instruction data and the production use symbol combination specified on the basis is of the production use symbol combination data and the random data received from the sub main substrate 5.

When stopping the rotation of the sub-reel displayed on the display 35, for instance, the processor 70 performs following processes.

When receiving the sub-reel rotation start instruction data instructing to stop the first sub-reel (hereinafter referred as the first sub-reel stop data) after entering the sub-reel rotation start instruction data, the processor 70 stops updating the image of the first stop target sub-reel to stop the symbol predetermined position (lower section) in the previously set in the range for pulling from the symbol that allowed to stop in the predetermined position (for instance, lower section) on the display 35 at the production use symbol combination identified by the production use symbol combination data and the random number data, and the symbol shown in the predetermined position (lower section) at the timing of receiving the first sub-reel stop instruction data.

In addition, when receiving the sub-reel rotation start instruction data instructing to stop the nth (n indicates an integer of 2 or 3) sub-reel (hereinafter referred as the nth sub-reel stop data) after entering the sub-reel rotation start instruction data, the processor 70 stops updating the image of the nth stop target sub-reel to stop the symbol in the previously set in the range for pulling from the symbol that allowed to stop in the predetermined position (lower section) in relation to the symbol of sub-reel stopped at the production use symbol combination identified by the production use symbol combination data and the random number data, and the symbol shown in the predetermined position (lower section) at the timing of receiving the nth sub-reel stop instruction data.

Hereinafter, the process of stopping the sub-reel displayed on the display 35 will be explained in detail.

Figure 18:
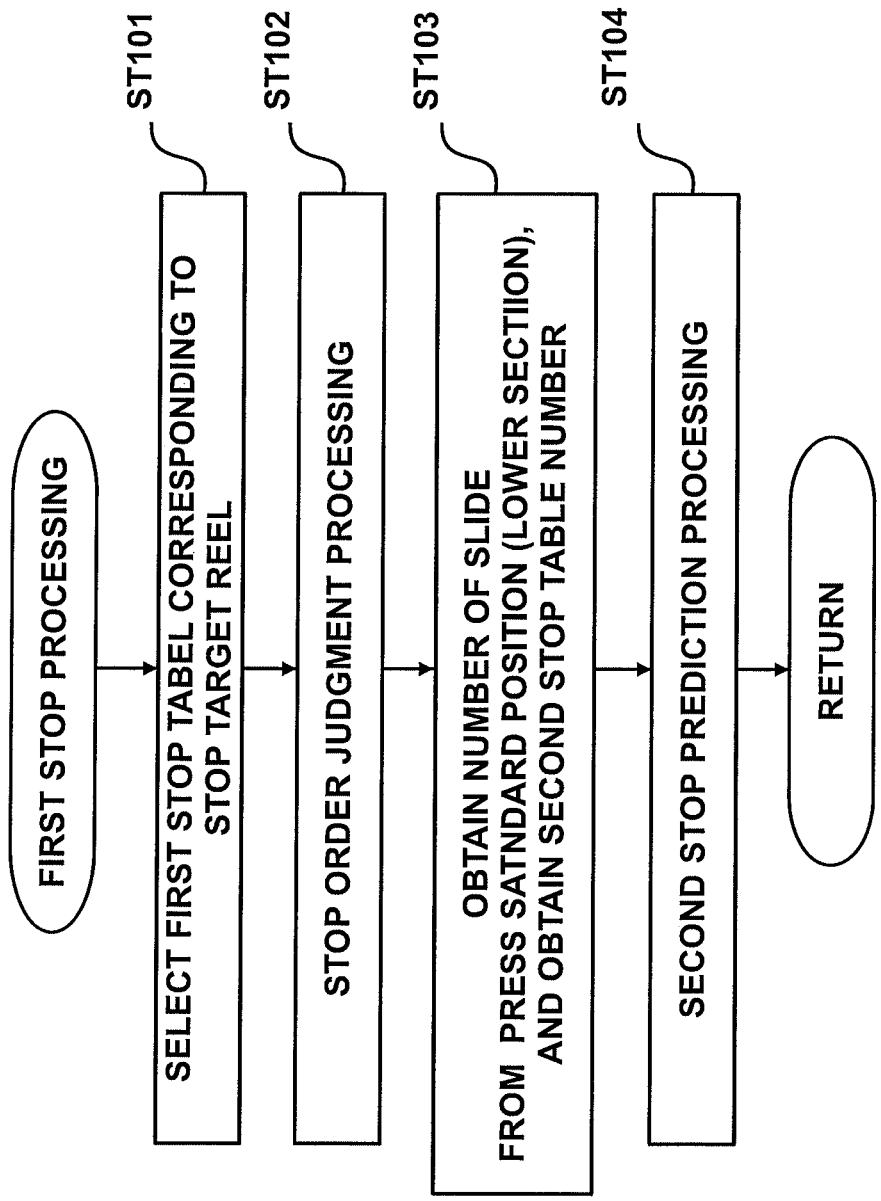
FIG. 18 is a flowchart for explaining processing of stopping sub-reel first from rotation start.

FIG. 18 is a flowchart to explain the process of stopping the sub-reel the first from the rotation start.

STEP ST101:

Once the sub-sub substrate 7 receives the first sub-reel stop instruction data from the sub main substrate 5, then selects the first stop table (FIG. 20) corresponding to the first stop target of the sub-reel based on the stop control table for production shown in FIG. 19.

FIG. 19 is a drawing showing the example of the stop control table for production.

In the stop control table for production shown in FIG. 19, "Flag number" indicates the production use symbol combination data, and "table" indicates a number identifies a plurality of production use symbol combination data associated with the production use symbol combination data (flag number). As shown in FIG. 19, the production use symbol combination data (flag number) is associated with several production use symbol combinations. For instance, the watermelon symbol combination, production use symbol combination data with the flag number "2", is associated with two types of production use symbol combination identified as "0" and "1".

At the stop control table for production shown in FIG. 19, the "1st table" indicates the identification number of the first stop table in the three sub-reels (left, middle and right) related to each production use symbol combinations. Namely, three first stop tables (group of the first stop tables) corresponding to three sub-reels (left, middle and right) is associated to one production use symbol combination. For example, when the production use symbol combination data (flag number) is "2" and table is "1" and the "watermelon" symbol combination, the "sixth" of the first stop table of the sub-reel on the left as well as the "fourth" of the first stop table of the sub-reels on the right and middle are associated.

Therefore one production use symbol combination data (flag number) is associated with several first stop tables.

In addition, the stop control table for production shown in FIG. 19, the number of "distribution" is a number that indicates the winning probability of selecting one symbol combination from several production use symbol combinations associated with the same production use symbol combination data, and it is the same numbers as winning probability that described in FIG. 8.

First of all, the sub-sub substrate 7 receives the production use symbol combination data and random numbers data from the sub main substrate 5 on the beginning of rotation of the sub-reel. Afterwards the sub-sub substrate 7 references the stop control table for production shown in FIG. 19, to identify the production use symbol combination for the (first stop table group).

For instance, when the sub-sub substrate 7 receives "2" as a production use symbol combination data (flag number), the sub-sub substrate 7 specifies one of the "watermelon" symbol combination from two identified "watermelon" symbol combination "0" and "1" as a winning symbol pattern for the production of the sub-reel on the basis of distribute number and random number data.

For example, when the production use symbol combination data (flag number) is "2" and table is "1" and the "watermelon" symbol combination, the "sixth" of the first stop table of the sub-reel on the left as well as the "fourth" of the first stop table of the sub-reels on the right and middle are associated.

When the production use symbol combination data (flag number) is "2" and the "watermelon" symbol combination, which table is one, is specified, in concrete terms, the sixth first stop table relates to the left sub-reel, the fourth first stop table relates to the middle sub-reel, and the fourth first stop table relates to the right sub-reel are identified as the first stop table group.

Next, when the sub-sub substrate 7 receives the first sub-reel stop instruction data from the sub main substrate 5 in the step ST101, the aforementioned first sub-reel stop instruction data selects the first stop table corresponding the stop target sub-reel (left, middle and right) from the stop table group (three first stop tables) identified above.

For instance, when the production use symbol combination data (flag number) is "2" and the "watermelon" symbol combination, which table is one, is specified, the sub-sub substrate 7 selects the 6th of first stop table for the sub-reel on the left when the first sub-reel stop instruction data for the sub-reel on the left is received.

STEP ST102:

Next, in the case of the sub-sub substrate 7 receives the first sub-reel stop instruction and the stop order judgment data from the sub main substrate 5, according to the stop order judgment data, selects data table to use from the first stop table in FIG. 20 selected in the step ST102.

FIG. 20 is a drawing showing an example of the first stop table.

In the first stop table shown in FIG. 20, "the symbol number" indicates the identification number of the symbols of 21 pieces disposed on the peripheral surface of sub-reel.

The "slide frame number" indicates the number of frames slides between timing of receiving the sub-reel stop instruction data and the timing of stopping the sub-reel, when the symbol corresponding to the "symbol number" is on the predetermined place (lower section, for instance) in the timing of receiving the sub-reel stop instruction data.

The "stop position" indicates at least a part of symbols that are allowed to stop in a predetermined position (for instance, lower section) in the symbols of 21 pieces disposed on the peripheral surface of sub-reel. The bullet in the figure indicates the symbols that allowed to be stopped at the predetermined position (lower section) and the arrow pointing up indicates the symbols that prohibited to stop at the predetermined position (lower section). When the "slide frame number" of the symbol is "0", it corresponds to the symbol of the bullet, and when the "slide frame number" of the symbols are more than or equal to "1", it corresponds to the symbol of the arrow pointing up.

The second stop table shows the identification number of the second stop table (FIG. 25) which is selected when the symbols corresponding to the symbol number is stopped to a predetermined position (lower section).

The first stop table shown in FIG. 20, the data table associated with the "symbol number", the "slide frame number" and the second stop table includes two series of "TRUE" and "FALSE".

If the result shown in the stop order determination data indicates the stop order of the main-reel is matched to the stop order set in the winning combination of gaming, the sub-sub substrate 7 select the [TRUE] data table, in other cases, select [FALSE] data table.

For example, the data table of [TRUE] is more likely to be aligned the advantageous stop symbol pattern for production (the stop symbol pattern corresponding to the winning prize of the main-reel) determined by production use symbol combination, and the data table [FALSE] is more likely to be aligned blank stop symbol patterns, as the value of the "slide frame number" corresponding to each "symbol number" (the pull-in range from a predetermined position of each symbol) is set differently.

STEP ST103:

Next, based on the table correspondence to the "symbol number" and the "slide frame number" selected from among the first stop table in step ST102, the sub-sub substrate 7 identifies the symbol of the stop target that the closest to the symbol of stop target sub-reel (reaches the predetermined position with the smallest rotation angle) displayed in the predetermined position (for example, lower section) in the reception timing of the first sub-reel stop instruction data.

Specifically, when the sub-sub substrate 7 receives the first sub-reel stop instruction data, and the sub-sub substrate 7 acquires the "symbol number" corresponding to the symbol shown in the predetermined position (lower section) on the display 35 according to the rotation angle of the stop target sub-reel at the reception timing. Then, the "slide frame number" associated with the aforementioned acquired "symbol number" is acquired based on the data table of the "symbol number" and "slide frame number" selected from the first stop table in the step ST 102.

Once the sub-sub substrate 7 obtains the "slide frame number", the sub-sub substrate 7 slides number of symbols in accordance with the "slide frame number", and stops updating videos of the first stop target sub-reel.

In addition, based on the table correspondence to the "symbol number" and the "second stop table" selected from among the first stop table in step ST102, the sub-sub substrate 7 obtains the identification number of the second stop table (FIG. 25) associated with the "symbol number" of symbols displayed in the predetermined position (lower section) in the reception timing of the first sub-reel stop instruction data. The identification number of the second stop table, obtained in this process, specifies two second stop tables corresponding to two sub-reels which have not received a stop instruction yet.

STEP ST104:

Once the stop position of the first sub-reel is determined, the (7) execute the second stop prediction processes step, to prepare a stop of the second sub-reel by acquiring "slide frame number" at step ST103. In the second stop prediction process, the combination of symbols that are allowed in production use symbol combination identified by the production use symbol combination data and random number data and the symbols display on the display 35 in the sub-reel determined stop position previously is considered, and, whether stopping at a predetermined position (for example, lower section) for each symbol in sub-reel to stop in the second is allowed or not is determined. The stop judgment table (FIG. 23, virtual stop buffer) associated with the "symbol number" is generated by scoring the result of determination.

Figure 22:
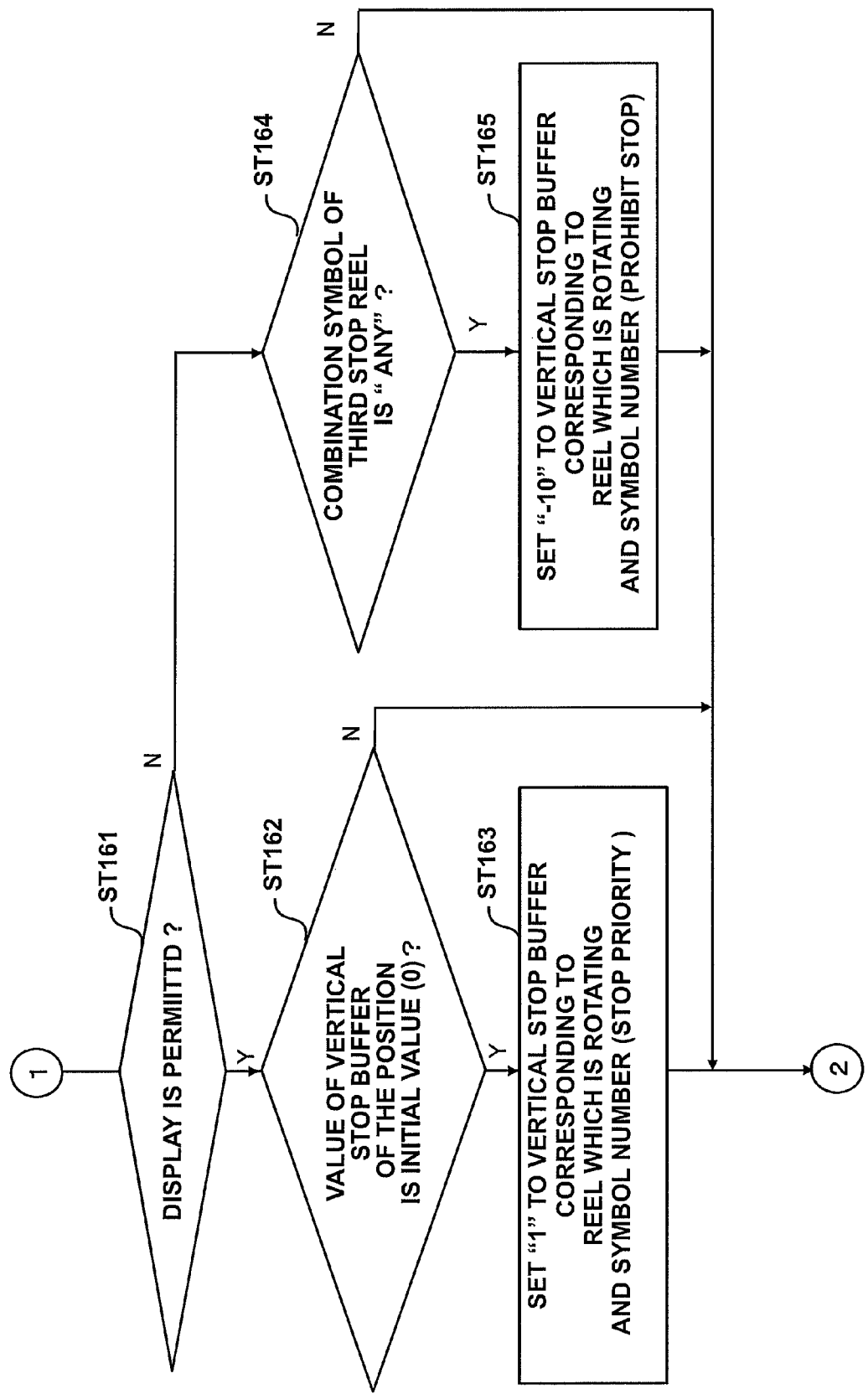
FIG. 22 is a flowchart for explaining second stop prediction processing.

FIGS. 20 and 22 are flowcharts to explain the second stop prediction process step.

Figure 21:
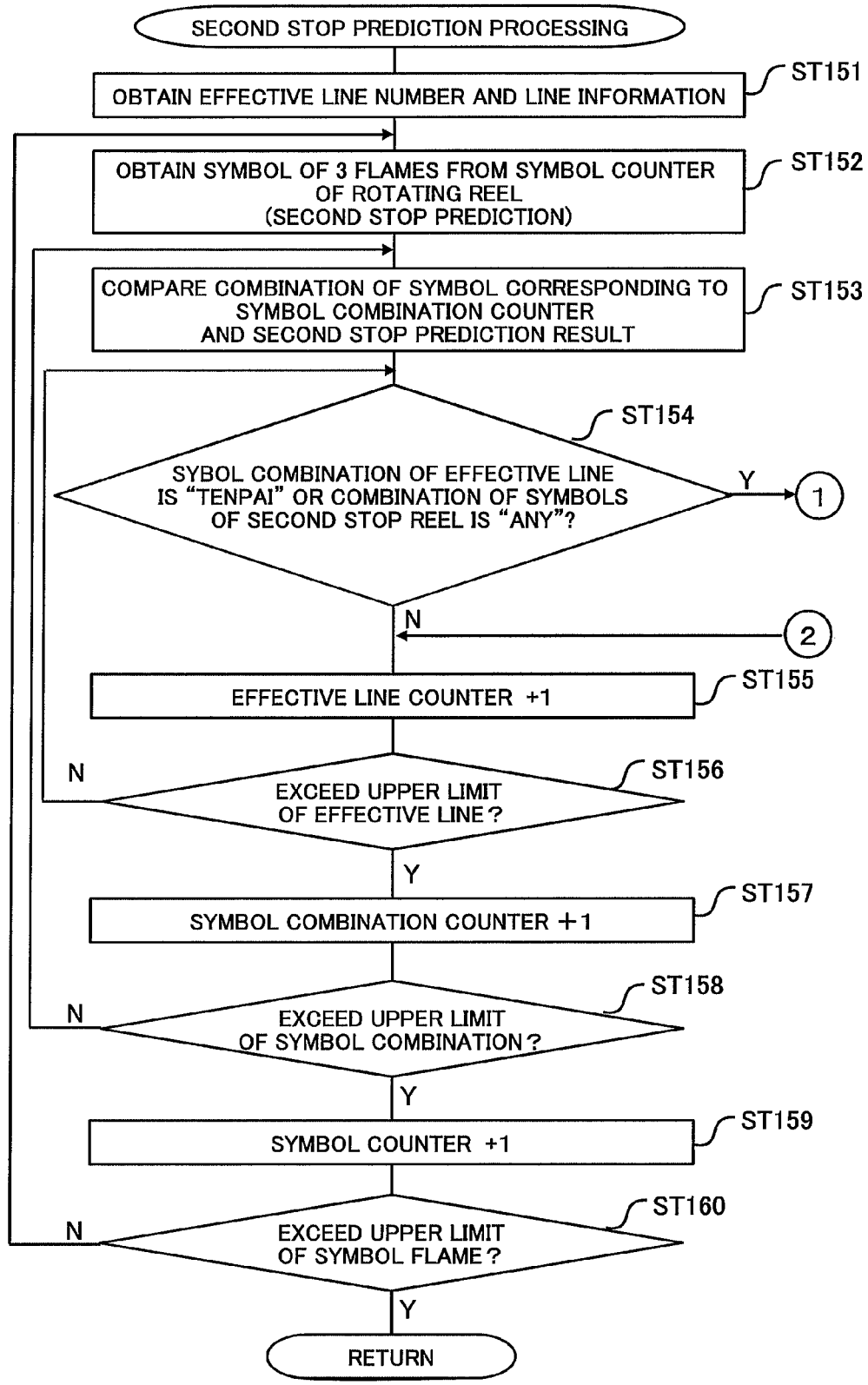
FIG. 21 is a drawing for showing an example of second stop prediction table.

The sub-sub substrate 7 executes the second stop prediction process shown in FIG. 21 and FIG. 22 to each of the two sub-reels rotating that has not received the stop instruction yet, and generates two virtual stop buffers (FIG. 23) corresponding to the two sub-reels.

STEP ST151:

The sub-sub substrate 7 obtains the number of effective lines and the line information on sub-reel, based on the data transmits from the sub main substrate 5 such as the data indicating number of medals bet. The effective lines correspond to the winning line in main-reel, for example as in the winning line, is set from two lines diagonal direction and three lines in the horizontal direction.

The sub-sub substrate 7 obtains information on types of symbols in the three frames consecutive from the symbol counter during the sub-reel is rotating. The symbol counter is associated with the aforementioned "symbol number". For example, when the symbol counter is "0", the sub-sub substrate 7 obtains the information on the types of symbols "0", "1" and "2" (symbol type identification information).

STEP ST153:

The sub-sub substrate 7 compares symbols of three frames acquired in step ST152, and symbol pattern combined with symbols of three frames displayed on the display 35 that the stop position in the sub-reel is determined already (the second stop prediction pattern), and symbol pattern acquired on the basis of the symbol combination counter (symbol combination pattern).

For instance, the sub-sub substrate 7 stores the data table (symbol combination table) that collects symbol patterns of advantageous stop symbol patterns other than blank of the production use symbol combination at sub-reel to the system storage unit 76. The symbol combination counter specifies one of the symbol pattern registered in the symbol combination table (combination of pattern type identification information).

STEP ST154:

The sub-sub substrate 7 compares the second stop prediction pattern and the symbol combination patterns in the one effectiveness line. Then the sub-sub substrate 7 proceeds to the step ST161 (FIG. 22) when two symbols on the second stop prediction pattern and two symbols of the symbol combination pattern in the one effectiveness line are matched (If the advantageous stop symbol pattern for production is matched except for the symbol to stop on the third).

In addition, the sub-sub substrate 7 proceeds to the step ST161 even if the stop symbol pattern on the second sub-reel is the advantageous for production or any.

In production use symbol combination identified by the production use symbol combination data and random numbered data, the sub-sub substrate 7 determines whether the display symbol combination in the second stop prediction pattern is permitted or not. If it is allowed, the process shifts to the step ST162, and if it is not allowed, the process shifts to the step ST164.

STEP ST162:

If the display of the symbol combination of the second stop prediction pattern is allowed at the step ST161, the sub-sub substrate 7 obtains the score (priority data) corresponding to the "symbol number" of the symbol counter specified in the step ST152 from the virtual stop buffer (FIG. 23). And the sub-sub substrate 7 determines whether the obtained stop score is the initial value (0) or not. If the stop score is the initial value, the process shifts to the step ST163, and if the score is not the initial value, the process shifts to the step ST155.

STEP ST163:

In the step ST162, when the stop score of the virtual stop buffer is determined as the initial value, the sub-sub substrate 7 sets 1 as a stop score. The symbols of the "symbol number" which sets 1 to the stop score, raises the priority of stopping the predetermined position (lower section) on the display 35. After STEP ST163, the sub-sub substrate 7 shifts to STEP ST155.

STEP ST164:

On the other hand, if the display of the symbol combination of the second stop prediction pattern is not allowed in step ST161, and the sub-sub substrate 7 determines whether the symbol stopped on the third sub-reel is advantageous or not. The process proceeds to step ST165 if stop symbol pattern is the advantageous for production, and if not, the process proceeds to step ST155.

Step ST165:

In the case of any symbol stopped on the third sub-reel is advantageous for production, the sub-sub substrate 7 sets "−10" as stop score of the virtual stop buffer (FIG. 23) corresponding to the symbol number of the symbol counter specified in step ST152. The symbol of the "symbol number" set −10 as a stop score is prohibited to stop at a predetermined position (lower section) on the display 35. After STEP ST165, the sub-sub substrate 7 shifts to STEP ST155.

STEP ST155, ST156;

The sub-sub substrate 7 adds "1" to the effectual line counter (counter specifies effectual line). When the effectual line counter does not exceed the upper limit after adding, the sub-sub substrate 7 repeats the processes after step ST154. From this, the sub-sub substrate 7 executes the processes after step ST154 to other lines. If the effectual line counter exceeds the upper limit (namely, the processes after step ST154 are executed to all the effectual lines), the sub-sub substrate 7 shifts to the step ST157.

STEP ST157, ST158;

The sub-sub substrate 7 adds 1 to the symbol combination counter. When the symbol combination counter does not exceed the upper limit after adding, the sub-sub substrate 7 repeats the processes after step ST153. From this, the sub-sub substrate 7 executes the processes after step ST154 to other symbol combination patterns registered in the symbol combination table. If the symbol combination counter exceeds the upper limit (namely, the processes after step ST153 are executed to all symbol combination patterns registered in the symbol combination table), the sub-sub substrate 7 shifts to the step ST159.

STEP ST159, ST160:

The sub-sub substrate 7 adds "1" to the symbol counter. When the symbol counter has not exceeded the upper limit in the result of adding, the sub-sub substrate 7 repeats the processes after step ST152. Thus, the sub-sub substrate 7 executes the processes after aforementioned step ST152 to the other second stop prediction pattern (combinations of symbols for three consecutive). The sub-sub substrate 7 ends the second stop prediction processing when the symbol counter exceeds the upper limit (In other words, when the processes after aforementioned step ST152 to the other second stop prediction pattern is executed.

By the aforementioned second stop prediction process step from ST151 to ST165, for example, the virtual stop buffer shown in FIG. 23 is generated.

Figure 24:
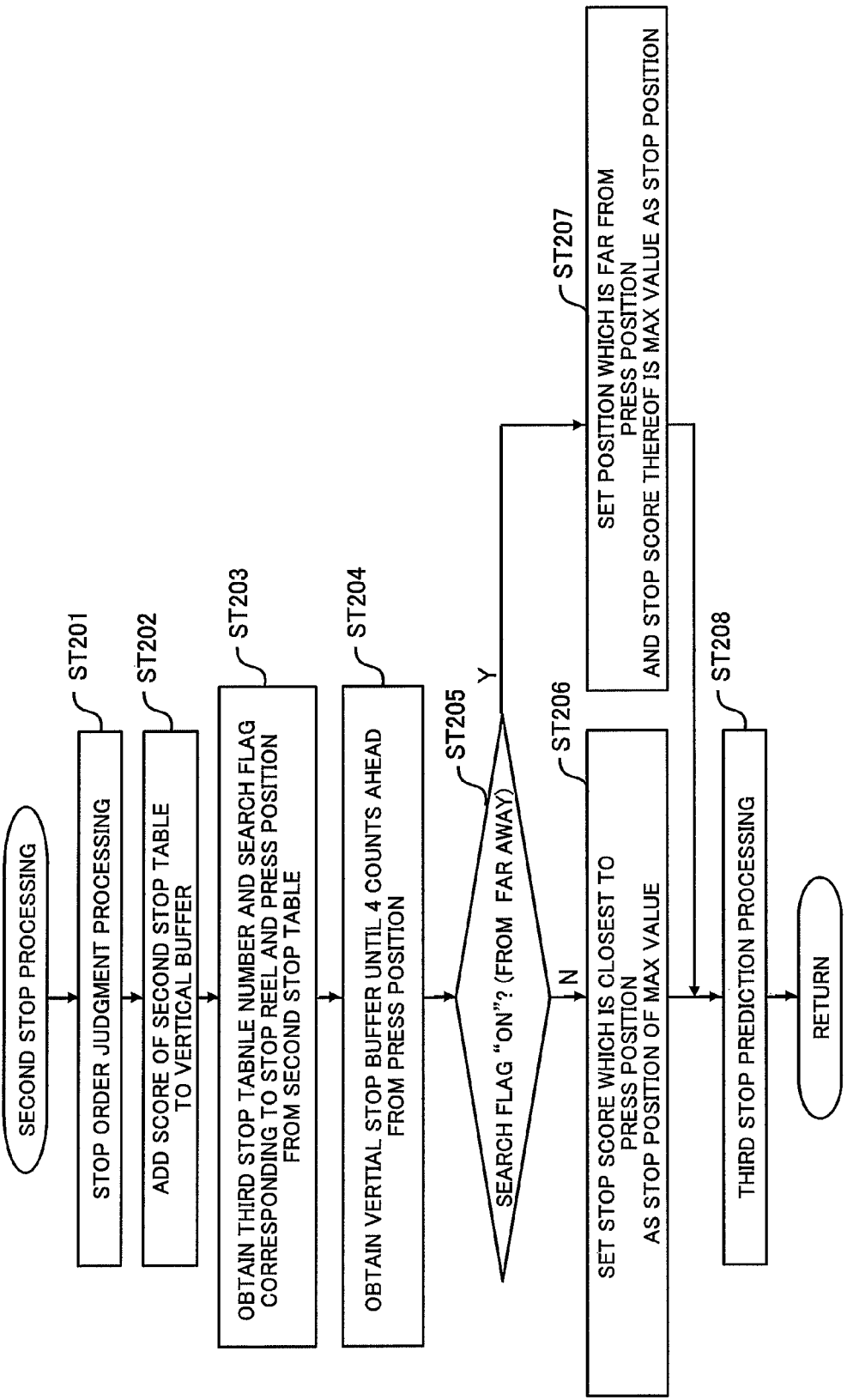
FIG. 24 is a flowchart for explaining processing of stopping sub-reel secondly from rotation start.

Next, the process of stopping the sub-reel the second from the rotation start will be explained with reference to the flowchart of FIG. 24.

STEP ST201:

When the sub-sub substrate 7 received the second sub-reel stop instruction data to stop sub-reel on the second and the stop order judgment data indicates the result of the stop order from the sub main substrate 5, the sub-sub substrate 7 selects the second stop table corresponding to the stop target sub-reel in the second sub-reel stop data from two of the second stop table specified by the identification number of the second stop table acquired in the step ST103 (FIG. 18). Further, the sub-sub substrate 7 selects data table corresponding to the stop order judgment data from the selected second stop table.

FIG. 25 is a drawing showing an example of the second stop table.

In the first stop table shown in FIG. 25, the "stop score", as in the aforementioned virtual stop buffer (FIG. 23), is the data indicating the priority to stopping the symbol predetermined position (lower section) on the display 35.

The "search flag" (Search direction data) is the data to reference in Step ST205 which will be described below, it specifies whether search from a distance or close position to the pressed position the stop position.

The third stop table shows identification number of the third stop table (FIG. 30) which is selected when the symbols corresponding to the symbol number is stopped to a predetermined position (lower section).

The second stop table shown in FIG. 25, the data table associated with the "symbol number", the "stop score" and the third stop table includes two series of "TRUE" and "FALSE".

If the result shown in the stop order determination data indicates the stop order of the main-reel is matched to the stop order set in the winning combination of gaming (Alternatively, the stop order of sub-reel is matched to the stop order set in the production use symbol combination), the sub-sub substrate 7 select the [TRUE] data table, in other cases, select [FALSE] data table.

STEP ST202:
Next, the sub-sub substrate 7 adds the same "symbol number" of the "stop score" of the table data selected according to the stop order judgment data in step ST201 and the "stop score" of the virtual stop buffer in the FIG. 23 of the stop target sub-reel is generated in the second stop prediction process (FIG. 21 and FIG. 22). FIG. 26 shows an example of the virtual stop buffer after aforementioned addition.

STEP ST203:
Next, the sub-sub substrate 7 references table data selected in accordance with the stop order judgment data in the step ST201. When the timing of receiving the second sub-reel stop data, the sub-sub substrate 7 acquires the identification number and the search flag of the third stop table (FIG. 30) corresponding to the "symbol number" of the symbol (the symbol stopped in the stop position/the second stop timing symbol) stopped in predetermined position (lower section) on the display 35.

For instance, when the [TRUE] data table of the second stop table shown in the FIG. 25 is selected and the "symbol number" of the symbol stopped on the stop position is "14", the sub-sub substrate 7 acquires the identification number(1) of the third stop table and the search flag(1) in the area surrounded by a dotted line in FIG. 25.

STEP ST204:
Then, the sub-sub substrate 7 acquires the virtual stop buffer for up to four frames from the "symbol number" of the symbol on the press position.

For instance, when virtual stop buffer shown in FIG. 21 is generated and the "symbol number" of the press position is "15", the sub-sub substrate 7 acquires area surrounded by a dotted line in the upper side.

STEP ST205:
Next, depending on the value of the search flags acquired in step ST203, when the search flag is "0", the sub-sub substrate 7 shifts to the STEP ST206. In the case of the search flag is "1", the sub-sub substrate 7 shifts to the STEP ST207.

STEP ST206:
When the search flag is set to "0", the sub-sub substrate 7 sets up a point where nearest from the press position of the virtual buffer stop of all five frames obtained in step ST204 and highest point of stop score as a symbol of stop position.

For instance, if the "symbol number" of the symbol on the press position in the virtual stop buffer shown in FIG. 26 is "15", the sub-sub substrate 7 sets up the symbol with symbol number "17" which is nearest to the symbol of the press position and the stop score is "2", which is maximum" as a stop position.

Further, in the virtual stop buffer shown in FIG. 26, in the case of the "symbol number" of the symbol at the press position is "3", the sub-sub substrate 7 sets up a symbol with the symbol number "3" as stop position where nearest from the symbol at the press position, and highest stop score "0" which is maximum ("0" in this example).

STEP ST207:
On the other hand, when the sub-sub substrate 7 sets up the point where farthest from the press position of the virtual buffer stop of all five frames obtained in step ST204 and highest point of stop score as a symbol of stop position.

For instance, if the "symbol number" of the symbol on the press position in the virtual stop buffer shown in FIG. 26 is "15", the sub-sub substrate 7 sets up the symbol with symbol number "19" which is farthest to the symbol of the press position and the stop score is "2", which is maximum" as a stop position.

Further, in the virtual stop buffer shown in FIG. 26, in the case of the "symbol number" of the symbol at the press position is "3", the sub-sub substrate 7 sets up a symbol with the symbol number "7" as stop position where furthest from the symbol at the press position, and highest stop score "0" which is maximum ("0" in this example).

The sub-sub substrate 7 sets the "symbol number" of the stop position in Step ST206 or ST207. When the symbol of the "symbol number" stops to the predetermined position on the display, the sub-sub substrate 7 stops updating videos of the second stop target sub-reel.

STEP ST207:
Once the stop position of the second sub-reel is determined, the (7) execute the third stop prediction processes step, to prepare a stop of the third sub-reel. At the third stop prediction process step, same as aforementioned second stop prediction process step (FIG. 21 and FIG. 22), the virtual stop buffer associated with the "symbol number" and "stop score" is generated.

Figure 27:
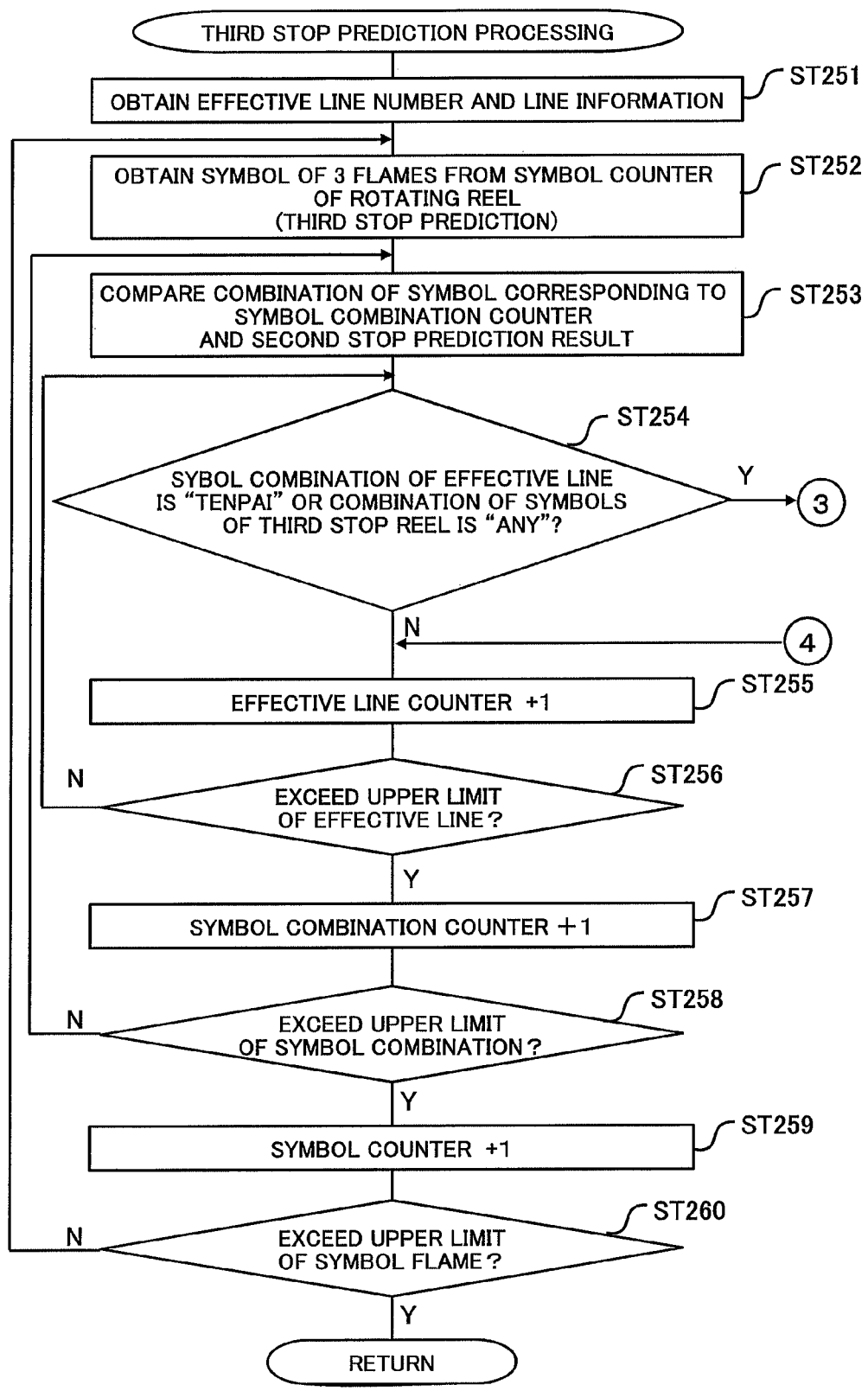
FIG. 27 is a first flowchart for explaining third stop prediction processing.
Figure 28:
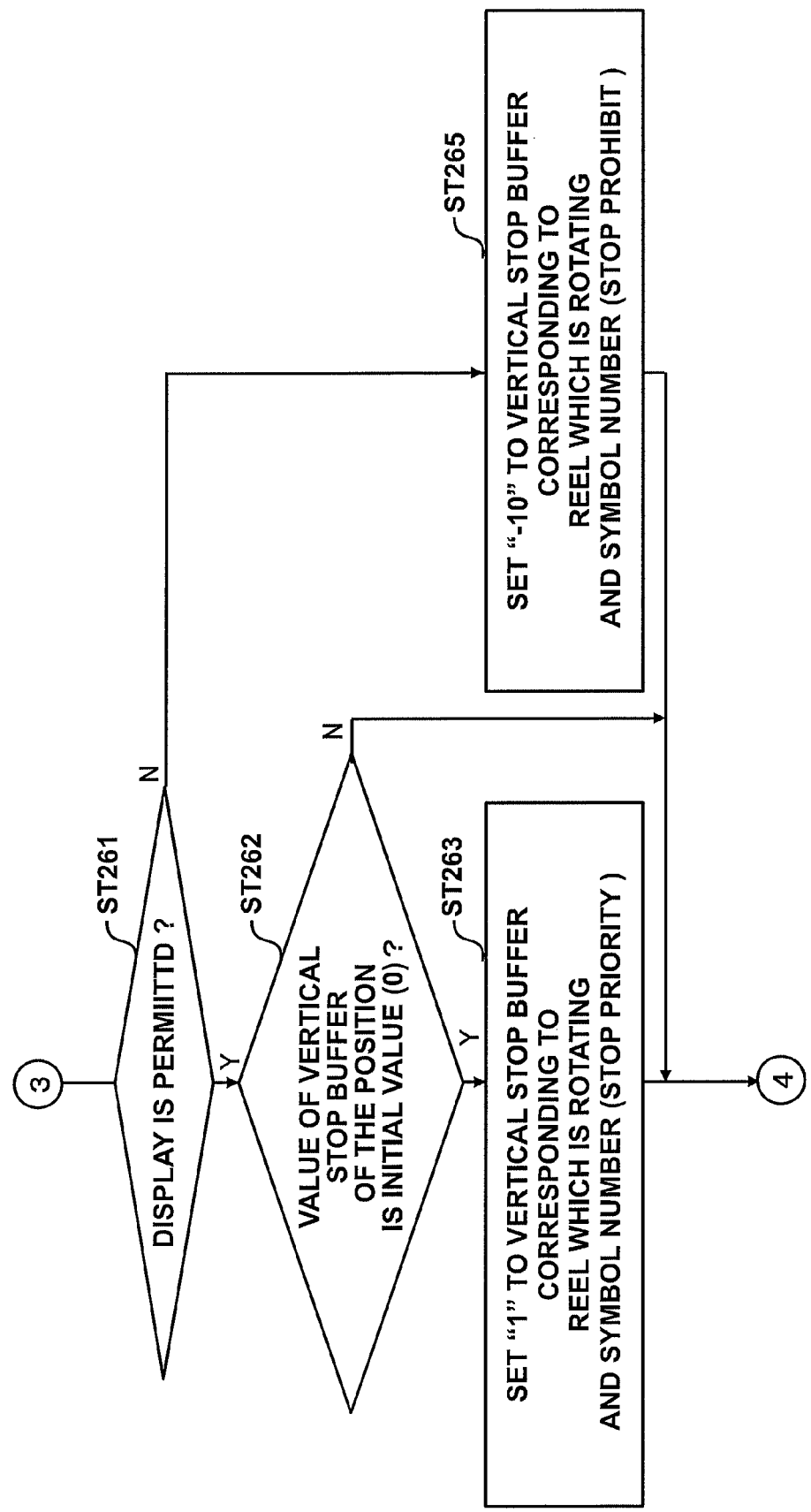
FIG. 28 is a second flowchart for explaining third stop prediction processing.

FIGS. 27 and 28 are flowcharts to explain the third stop prediction process step. Steps ST251-ST265 in FIG. 27 and FIG. 28 are correspond to steps ST151-265 in FIG. 21 and FIG. 22, and almost same processes are executed. However, the step ST164 (FIG. 22) on the second stop table is omitted on the third stop prediction process step.

Figure 29:
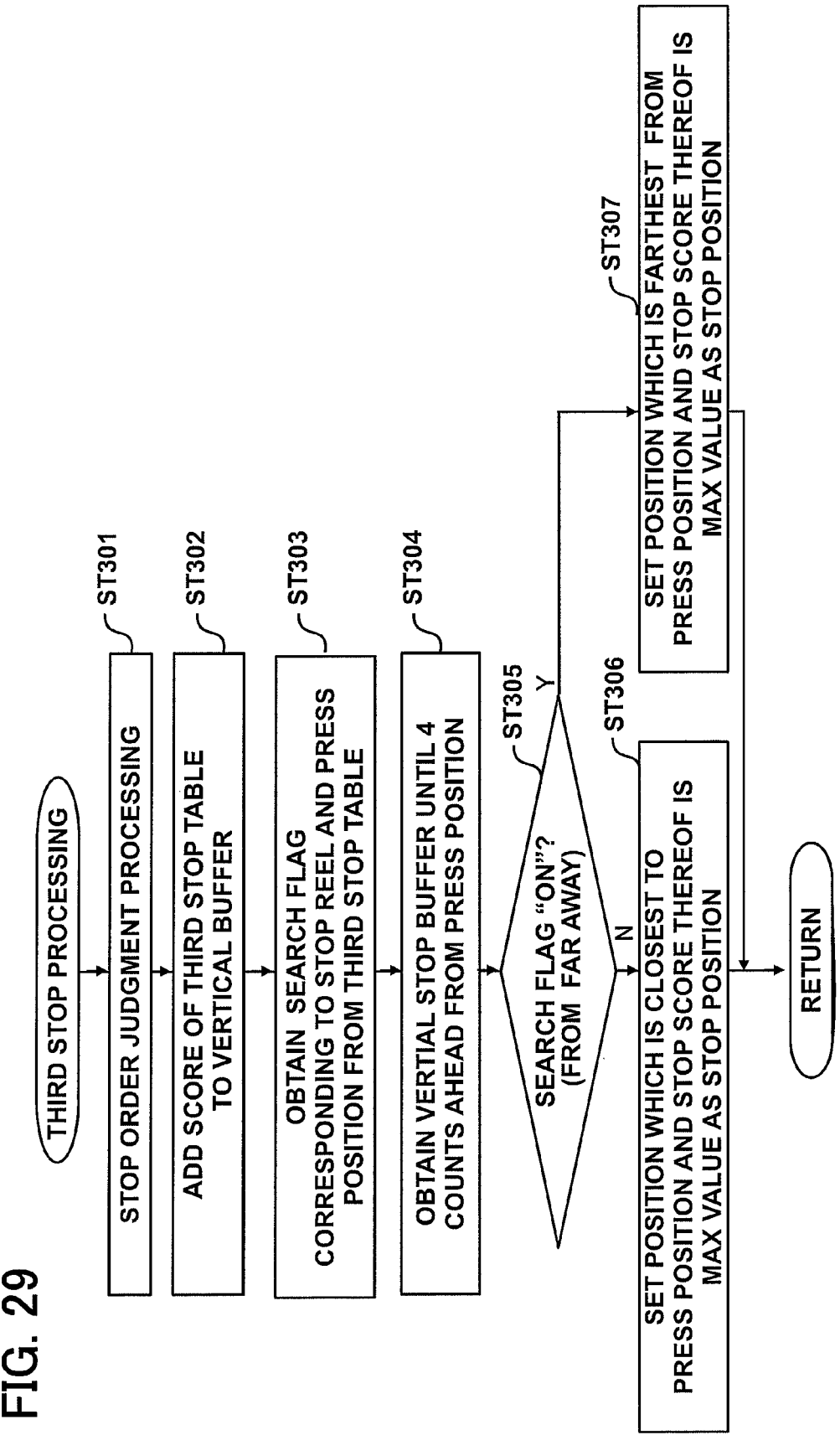
FIG. 29 is a flowchart for explaining processing of stopping sub-reel thirdly from rotation start.

Next, the process of stopping the sub-reel the third from the rotation start will be explained with reference to the flowchart of FIG. 29.

Step ST301:
When the sub-sub substrate 7 received the third sub-reel stop instruction data to stop sub-reel on the third and the stop order judgment data indicates the result of the stop order from the sub main substrate 5, the sub-sub substrate 7 reads the third stop table (FIG. 30) specified by the identification number acquired in the step ST203 (FIG. 24), and selects the table data according to the stop order judgment data from third stop table.

FIG. 30 is a drawing showing an example of the third stop table.

The third stop table shown in FIG. 30, the "stop score", the "search flag" is the same as the second stop table shown in FIG. 25. The third stop table shown in FIG. 30, the data table associated with the "symbol number", the "stop score" and the third stop table includes two series of "TRUE" and "FALSE".

If the result shown in the stop order determination data indicates the stop order of the main-reel is matched to the stop order set in the winning combination of gaming (Alternatively, the stop order of sub-reel is matched to the stop order set in production use symbol combination), the sub-sub substrate 7 select the [TRUE] data table, in other cases, select [FALSE] data table.

STEP ST302:

The sub-sub substrate 7 adds the same "symbol number" of the "stop score" of the table data selected according to the stop order judgment data in step ST301 and the "stop score" of the virtual stop buffer of the stop target sub-reel is generated in the third stop prediction process (FIG. 27 and FIG. 28).

STEP ST303:

Next, the sub-sub substrate 7 references table data selected in accordance with the stop order judgment data in the step ST301. When the timing of receiving the third sub-reel stop data, the sub-sub substrate 7 acquires the search flag corresponding to the "symbol number" of the symbol (the symbol stopped in the stop position/the third stop timing symbol) stopped in predetermined position (lower section) on the display 35.

STEP ST304:

The sub-sub substrate 7 acquires the virtual stop buffer for up to four frames from the "symbol number" of the symbol on the press position.

STEP ST305:

Next, depending on the value of the search flags acquired in step ST303, when the search flag is "0", the sub-sub substrate 7 shifts to the STEP ST306. In the case of the search flag is "1", the sub-sub substrate 7 shifts to the STEP ST307.

STEP ST306:

When the search flag is set to "0", the sub-sub substrate 7 sets up a point where nearest from the press position of the virtual buffer stop of all five frames obtained in step ST304 and highest score of stop point as a symbol of stop position.

STEP ST307:

On the other hand, when the sub-sub substrate 7 sets up the point where farthest from the press position of the virtual buffer stop of all five frames obtained in step ST304 and highest score of stop point as a symbol of stop position.

The sub-sub substrate 7 sets the "symbol number" of the stop position in Step ST306 or ST307. When the symbol of the "symbol number" stops to the predetermined position on the display, the sub-sub substrate 7 stops updating videos of the third stop target sub-reel.

As stated above, according to the slot machine 1 related to the present embodiment, data indicating beginning of the rotation of the main-reel is entered into the sub-sub substrate 7 through the sub main substrate 5, the sub-sub substrate 7 configures of the image of sub-reel starts to rotate in unison and displays on the display 35. Moreover, the data indicating the stop of the main-reel is inputted into the through the sub main substrate 5, the sub-sub substrate 7 generates the images sub-reel stops at the symbol corresponding to the input timing of the data and displays on the display 35.

Thus, in the slot machine 1 related to the present embodiment, the sub-reel enters the data indicating the reel rotation starts, then generates and displays the image of sub-reel rotation on the display 35. Therefore, the sub main substrate 5 need not be specified the image of sub-reel in every frame period. Therefore, the screen control data which transmit from sub main substrate 5 to sub-sub substrate 7 can be significantly reduced. By reducing the data transmission for screen control, delay due to the process of transmitting and receiving data is shortened, therefore, it is possible to improve significantly the response to start rotation of the sub-reel from pressing the start lever 205.

Furthermore, in the slot machine 1 related to the present embodiment, the sub-sub substrate 7 reduces the data transmission for screen control same as stated above by entering the data indicating reel stop, generates the stop image of sub-reel and displays on the display 35, therefore, it is also possible to improve the response to stop the rotation of sub-reel from pressing the reel stop button significantly.

Moreover, according to the slot machine 1 related to the present embodiment, as stated above, when compared to rendering the entire image of 30 fps in both even numbered frames and odd numbered frames of 60 fps, by rendering lower half of 30 FPS in the processing of even numbered frame of 60 fps and rendering upper half of 30 fps in the processing of odd numbered frame, the processing load of the processor 70 can be reduced to half.

Thus, by delaying image rendering, image quality degradation can be prevented,

Additionally, according to the slot machine 1 related to the present embodiment, it is possible to have various data relates to the rotation control of the video of the sub-reel. Therefore, the pressure of the storage capacity of the sub main substrate 5 as the need to manage large amount of data to determine the production contents can be avoided.

This invention is not limited to the embodiments set forth herein, includes variety of variation.

Furthermore, in aforementioned embodiment, the stop order of sub-reel is determined in the sub main substrate 5, however the present invention is not limited thereto. The stop order of sub-reel may be determined in the sub main substrate 5 in other embodiment of the present invention.

In aforementioned embodiment, in STEP ST13 shown in FIG. 10, the frame buffer FBO_A is set as rendering target and the frame buffer FBO_B is set as back buffer target. However, the opposite setting may be implemented.

Furthermore, the flow shown in FIG. 12, the processes of STEP44 are performed in the case of even numbered frame, and the processes of STEP47 are performed in the case of odd numbered frame. However, the opposite processing may be performed.

In aforementioned embodiment, the example of dividing the 30 fps use flame buffer 103 upper and lower when scissoring is exemplified. However scissoring can be done in any and several area besides upper and lower and can be performed rendering by dividing thereto. Further, not only 30 fps or 60 fps frame rate, any frame rates may be adopted.

In addition, an area on the display to render by the 60 fps use flame buffer 105 is not limited to foregoing, it is optional.

INDUSTRIAL APPLICABILITY

The present invention is applicable to an image processing system.

The invention claimed is:

1. A sub-sub substrate comprising:
a display screen;
a 30 frames per second (fps) use frame buffer including a first frame buffer and a second frame buffer, and configured to store image data of an image to be displayed on the display screen at a first rate, the first frame buffer and the second frame buffer being alternately selected by the 30 fps use frame buffer as a first rendering target and a first reading target;

a 60 fps use frame buffer including a third frame buffer and a fourth frame buffer, and configured to store image data of a second rate which is shorter than the first rate, the image data of the second rate including first image data and second image data, the third frame buffer and the fourth frame buffer being selected as a second rendering target and a second reading target; and a control unit configured to:
when processing the first image data, clear a memory of the first rendering target among the first frame buffer and the second frame buffer, write the image data of the first rate corresponding into one or more first areas among a plurality of divided areas of the first rendering target and not write in a second area other than the one or more first areas, when processing the second image data, not clear the memory of the first rendering target in which the first image data is written, write the image data of the first rate corresponding to the one or more first areas into the second area among the plurality of divided areas, not write in the one or more first areas, then switch the first rendering target and the first reading target between the first frame buffer and the second frame buffer, between the processing of the first image data and the processing of the second image data, write the image data read from the alternately selected frame buffer of the first reading target into the selected frame buffer of the second rendering target among the third frame buffer and the fourth frame buffer, and between the processing of the first image data and the processing of the second image data, and before or after the writing image data read from the alternately selected frame buffer of the first reading target, write the first image data or the second image data of the second rate into a predetermined area of the selected frame buffer of the second rendering target, wherein the processing of the first image data or the processing of the second image data is performed after the later of 1) the writing image data read from the alternately selected frame buffer of the first reading target, and 2) the writing the first image data or the second image data of the second rate.

2. An image processor as set forth claim 1, wherein the control unit is further configured to:
switch the second rendering target and the second reading target between the third frame buffer and the fourth frame buffer after the writing the first image data or the second image data of the second rate, and
then clear the memory of the second rendering target.

3. An image processor as set forth claim 1, wherein the display screen is further configured to display a plurality of images on at least a part of an area by variable displaying;
a first control unit configured to control a start and stop of the variable displaying on the display screen on the basis of an instruction of a player input and output a status data indicating a status of process of amusement by the start and the stop of the variable displaying;
a production unit including the display screen and configured to display at least video and produce in accordance with the process of amusement;
a second control unit configured to output production indication data indicating contents of a production corresponding to the status data of the first control unit; and an image storage unit configured to store image data,
wherein the control unit is a third control unit further configured to control the production unit so that the production indicating unit performs the production indicated by the production indication data, input image data corresponding to the production indication data from the image storage unit and display, on the display screen, an image constituted based on the image data when inputting the production indication data indicating the at least video to be displayed on the display screen.

4. An image processor as set forth claim 3, further comprising:
a start instruction input unit configured to input a start instruction of the variable displaying; and
a stop instruction input unit configured to input a stop instruction of the variable displaying,
wherein
the first control unit is further configured to start the variable displaying of the display screen and output start instruction data indicating the start instruction when inputting the start instruction by the start instruction input unit, and stop the variable displaying of the display screen and output stop instruction data indicating the stop instruction when inputting the stop instruction by the stop instruction input unit,
the second control unit is further configured to output the start instruction data and the stop instruction data input from the first control unit, and
the third control unit is further configured to perform a variable displaying symbol of a plurality of types on the display screen when inputting the start instruction data from the second control unit.

5. An image processor as set forth claim 4, wherein
the display screen includes a plurality of main-reels, a plurality of types of symbols formed on a surface of a cylinder thereof, and a rotation drive unit driving rotation of the plurality of main reels,
the first control unit is further configured to control the rotation drive unit so that the plurality of main reels rotates all at once when inputting the start instruction by the start instruction input unit, and stop rotation of one of the main reels when inputting the stop instruction of the one of the main reels by the stop instruction input unit, and
the third control unit is configured to display video showing that a plurality of sub reels is rotated at once by a plurality of symbols formed on a surface of a cylinder thereof when inputting the start instruction data from the second control unit, and display video showing that one of the sub reels corresponding to one of the main reels stops at a symbol corresponding to an input timing when inputting the stop instruction data instructing stop of one of the main reels from the second control unit.

6. An image processor as set forth claim 5, wherein the third control unit is further configured to:
obtain a rotation angle of a sub reel which should rotate at a predetermined speed when inputting the start instruction data from the second control unit, the sub reel including video in case that an object with a predetermined three-dimensional shape having a surface on which the plurality of symbols is mapped is positioned at a rotation angle obtained based on image data of the plurality of types of symbols and the rotation angle obtained for each of the sub reels in a predetermined period, and
update video of the plurality of the sub reels on the display screen at the predetermined period based on the video constituted, stop the update of the image of one of the sub reels so that the sub reel is stopped on the symbol according to a rotation angle of one of the sub reels at the input timing when inputting the stop instruction data instructing stop of one of the sub reels corresponding to the one of the main reels from the second control unit.

7. An image processor as set forth claim 6, wherein
the second rate is a rate which is half of the first rate,
when processing the first image data, the third control unit is further configured to clear the memory of the first rendering target and write image data of the first rate corresponding to the area into one of the one or more first areas among two divided areas of the memory of the first rendering target when processing one of first image data of even numbered and odd numbered image data of the second rate, and
the third control unit is further configured to write the image data of the first rate corresponding to the area into the second area among the two divided areas of the memory of the first rendering target and sequentially switch the first rendering target and the first reading target between the first frame buffer and the second frame buffer.

8. A method of image processing, the method including:
displaying, by a display screen, an image at a first rate, image data of the image displayed at the first rate being stored by a 30 frames per second (fps) use frame buffer including a first frame buffer and a second frame buffer, the first frame buffer and the second frame buffer being alternately selected by the 30 fps use frame buffer as a first rendering target and a first reading target;
storing, by a 60 fps use frame buffer including a third frame buffer and a fourth frame buffer, image data of a second rate which is shorter than the first rate, the image data of the second rate including first image data and second image data, the third frame buffer and the fourth frame buffer being selected as a second rendering target and a second reading target; and when processing the first image data, clearing, by a control unit, a memory of the first rendering target among the first frame buffer and the second frame buffer, writing, by the control unit, the image data of the first rate corresponding into one or more first areas among a plurality of divided areas of the first rendering target and not writing, by the control unit, in a second area other than the one or more first areas;
when processing the second image data, not clearing, by the control unit, the memory of the first rendering target in which the first image data is written, writing, by the control unit, the image data of the first rate corresponding to the one or more first areas into the second area among the plurality of divided areas, not writing, by the control unit, in the one or more first areas, then switching, by the control unit, the first rendering target and the first reading target between the first frame buffer and the second frame buffer;
between the processing of the first image data and the processing of the second image data, writing, by the control unit, the image data read from the alternately selected frame buffer of the first reading target into the selected frame buffer of the second rendering target among the third frame buffer and the fourth frame buffer; and
between the processing of the first image data and the processing of the second image data, and before or after the writing image data read from the alternately selected frame buffer of the first reading target, writing, by the control unit, the first image data or the second image data of the second rate into a predetermined area of the selected frame buffer of the second rendering target;
wherein the processing of the first image data or the processing of the second image data is performed after the later of 1) the writing image data read from the alternately selected frame buffer of the first reading target, and 2) the writing the first image data or the second image data of the second rate.

* * * * *